US 9,974,105 B2

(12) United States Patent
Sasai et al.

(10) Patent No.: US 9,974,105 B2
(45) Date of Patent: *May 15, 2018

(54) COMMUNICATION SYSTEM AND METHOD, INFORMATION PROCESSING APPARATUS AND METHOD, INFORMATION PROCESSING TERMINAL AND METHOD

(71) Applicant: SONY CORPORATION, Tokyo (JP)

(72) Inventors: Takashi Sasai, Kanagawa (JP); Hiroshi Kakuda, Tokyo (JP); Masamitsu Higo, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/348,506

(22) Filed: Nov. 10, 2016

(65) Prior Publication Data
US 2017/0064757 A1 Mar. 2, 2017

Related U.S. Application Data

(63) Continuation of application No. 14/594,603, filed on Jan. 12, 2015, now Pat. No. 9,516,687, which is a
(Continued)

(30) Foreign Application Priority Data
Oct. 16, 2001 (JP) .................................. 2001-317956

(51) Int. Cl.
H04W 76/23 (2018.01)
H04W 76/02 (2009.01)
(Continued)

(52) U.S. Cl.
CPC ......... *H04W 76/023* (2013.01); *H04W 4/008* (2013.01); *H04W 8/005* (2013.01);
(Continued)

(58) Field of Classification Search
None
See application file for complete search history.

(56) References Cited

U.S. PATENT DOCUMENTS 5,038,406 A 8/1991 Titterton et al.
6,041,048 A 3/2000 Erickson et al.
(Continued)

FOREIGN PATENT DOCUMENTS

EP 1130933 9/2001
GB 2360914 10/2001
(Continued)

OTHER PUBLICATIONS

Office Action mailed by the European Patent Office dated May 11, 2012, in European Application No. EP 02777850.5-1525 (6 pages).
(Continued)

Primary Examiner — Chi H Pham
Assistant Examiner — Shick Hom
(74) Attorney, Agent, or Firm — Paratus Law Group, PLLC

(57) ABSTRACT

The present invention relates to a communication system and a method thereof, an information processing apparatus and a method thereof, an information processing terminal and a method thereof, which can start wireless communication easily and promptly. When an electromagnetic wave radiated from a reader/writer of a PDA 2 is received in a reader/writer of a personal computer 1, the personal computer 1 notifies the PDA 2 of device information stored therein. The PDA 2 establishes synchronization for Bluetooth communication with the personal computer 1 in accordance with a Bluetooth address contained in the device information and selects a service in accordance with a service record contained in the device information to establish communication via Bluetooth. The present invention
(Continued)

can be applied to various information processing apparatuses such as a personal computer or a PDA.

12 Claims, 25 Drawing Sheets

Related U.S. Application Data continuation of application No. 13/468,496, filed on May 10, 2012, now Pat. No. 8,934,388, which is a continuation of application No. 12/121,548, filed on May 15, 2008, now Pat. No. 8,194,557, which is a continuation of application No. 10/492,562, filed as application No. PCT/JP02/10722 on Oct. 16, 2002, now Pat. No. 7,395,029.

(51) Int. Cl.
| | |
|---|---|
| H04W 56/00 | (2009.01) |
| H04W 4/00 | (2018.01) |
| H04W 8/00 | (2009.01) |
| H04L 29/12 | (2006.01) |
| H04L 29/06 | (2006.01) |
| H04W 8/26 | (2009.01) |
| H04W 84/18 | (2009.01) |
| H04W 92/18 | (2009.01) |
| H04W 48/16 | (2009.01) |
| H04W 84/20 | (2009.01) |

(52) U.S. Cl.
CPC ..... *H04W 56/002* (2013.01); *H04L 29/12254* (2013.01); *H04L 61/2038* (2013.01); *H04L 63/08* (2013.01); *H04W 8/26* (2013.01); *H04W 48/16* (2013.01); *H04W 76/02* (2013.01); *H04W 84/18* (2013.01); *H04W 84/20* (2013.01); *H04W 92/18* (2013.01)

(56) References Cited

U.S. PATENT DOCUMENTS

| | | |
|---|---|---|
| 6,295,292 B1 | 9/2001 | Voit et al. |
| 6,295,556 B1 | 9/2001 | Falcon et al. |
| 6,343,123 B1 | 1/2002 | Lehmacher et al. |
| 6,484,027 B1 | 11/2002 | Mauney et al. |
| 6,573,916 B1 | 6/2003 | Grossweiler, III et al. |
| 6,697,638 B1 | 2/2004 | Larsson et al. |
| 6,826,387 B1 | 11/2004 | Kammer |
| 6,857,021 B1 | 2/2005 | Schuster et al. |
| 6,885,848 B2 | 4/2005 | Lee |
| 6,895,215 B2 | 5/2005 | Uhlmann |
| 6,928,299 B1 | 8/2005 | Rinne et al. |
| 7,072,966 B1 * | 7/2006 | Benjamin ........... H04M 3/5175 379/265.12 |
| 7,152,238 B1 * | 12/2006 | Leung ................. H04L 63/0281 726/2 |
| 7,269,638 B2 | 9/2007 | Vestergaard et al. |
| 7,395,029 B2 * | 7/2008 | Sasai .................. H04W 56/002 455/41.2 |
| 8,194,557 B2 | 6/2012 | Sasai et al. |
| 9,516,687 B2 * | 12/2016 | Sasai .................. H04W 56/002 |
| 2002/0032039 A1 | 3/2002 | Kimata |
| 2002/0132632 A1 | 9/2002 | Brassil et al. |
| 2002/0137543 A1 | 9/2002 | Murnaghan et al. |
| 2002/0160765 A1 | 10/2002 | Okajima |
| 2002/0165006 A1 | 11/2002 | Haller et al. |
| 2002/0169000 A1 | 11/2002 | King |
| 2002/0198021 A1 | 12/2002 | Boesen |
| 2003/0005132 A1 | 1/2003 | Nguyen et al. |
| 2003/0013483 A1 | 1/2003 | Ausems et al. |
| 2003/0036350 A1 | 2/2003 | Jonsson et al. |
| 2005/0009561 A1 | 1/2005 | Hollstrom et al. |
| 2005/0170818 A1 | 8/2005 | Netanel et al. |

FOREIGN PATENT DOCUMENTS

| | | |
|---|---|---|
| JP | 2001-144781 | 5/2001 |
| JP | 2001-145163 | 5/2001 |
| JP | 2001-156704 | 6/2001 |
| JP | 2002-149948 | 5/2002 |
| JP | 2002-150142 | 5/2002 |
| WO | WO 01/45319 | 6/2001 |

OTHER PUBLICATIONS

Bluetooth SIG: "Specification of the Blue tooth System; Profiles, Specification vol. 2, Version 1.1;" Bluetooth SIG; Feb. 22, 2001; pp. 1-452; XP040422595; Part K2: Chapters 1.1, 2.1-2.4, 4.1-4.3, 5.1, 8.2, 8.4, Appendix 11; Part K1; Chapters 3.2.1, 3.2.4, 3.2.3, 6.1, 6.2, 6.4, 7.
Bluetooth SIG: "Specification of the Blue tooth System; Core, Specification vol. 1, Version 1.1;" Bluetooth SIG; Jan. 22, 2001; pp. 1-1048; XP040422596; Part E: Chapters 5.1.8, 5.1.9, 2.1-2.8, 4.5-4.7; Part B: Chapters 4.4.1.4, 9.6, 10.6.3, 10.6.4.
"Digital cellular telecommunications system (Phase 2+) (GSM); Universal Mobile Telecommunications System (UMTS); USIM Application Toolkit (USAT) (3GPP TS 31.111 version 4.4.0 Release 4); ETSI TS 131 111" ETSI Standards, LIS, Sophia Antipolis, Cedex, France, vol. 3-T3, No. v4.4.0, Jan. 9, 2001, XP014009745: chapters 6.4.27.3, 6.4.32-6.4.34, 6.6.27.3, 6.6.32-6.6.34, 8, +64-8,68, annexes K, L.
Akira NI'HE'l, Keitai Denwa wa Benrina Saifu ni Pocket ni Keitai dakega areba ii Seikatsu ga Kuru, Jul. 1, 2001, ASCH, vol. 25, No. pp. 278 to 279.

* cited by examiner

FIG. 9

| BLUETOOTH ADDRESS | 08:00:46:21:39:4D |
|---|---|
| DEVICE CLASS | PERSONAL COMPUTER |
| DEVICE NAME | VAIE |
| PASS KEY | 0123456 |
| LINK KEY | $K_A$ |
| SERVICE DATA BASE (SERVICE RECORD) | SERVICE ATTRIBUTE 1<br>SERVICE ATTRIBUTE 2<br>SERVICE ATTRIBUTE 3 |
| NUMBER CONNECTABLE | 2 |
| CONNECTION EFFECTIVE TIME | JST0:00—12:00 |
| CONNECTABLE DEVICE | 1. PERSONAL COMPUTER<br>2. PDA<br>3. CELLULAR PHONE |
| URL | http://www.abc.com/ |

COMMUNICATION SYSTEM AND METHOD, INFORMATION PROCESSING APPARATUS AND METHOD, INFORMATION PROCESSING TERMINAL AND METHOD

CROSS-REFERENCE TO PRIOR APPLICATION

This application is a continuation of U.S. patent application Ser. No. 14/594,603 (filed on Jan. 12, 2015 and issued as U.S. Pat. No. 9,516,687), which is a continuation of U.S. patent application Ser. No. 13/468,496 (filed on May 10, 2012 and issued as U.S. Pat. No. 8,934,388 on Jan. 13, 2015), which is a continuation of U.S. patent application Ser. No. 12/121,548 (filed on May 15, 2008 and issued as U.S. Pat. No. 8,194,557 on Jun. 5, 2012), which is a continuation of U.S. patent application Ser. No. 10/492,562 (filed on Apr. 14, 2004 and issued as U.S. Pat. No. 7,395,029 on Jul. 1, 2008), which is a National Stage Patent Application of PCT International Patent Application No. PCT/JP02/10722 (filed on Oct. 16, 2002) under U.S.C. § 371, which claims priority to Japanese Patent Application No. 2001-317956 (filed on Oct. 16, 2001), which are all hereby incorporated by reference in their entirety.

TECHNICAL FIELD

The present invention relates to a communication system and a method thereof, an information processing apparatus and a method thereof, and an information processing terminal and a method thereof. In particular, the present invention relates to a communication system and a method thereof, an information processing apparatus and a method thereof, and an information processing terminal and a method thereof enabling easy and prompt formation of a network with a plurality of devices, in wireless communication typified by Bluetooth®.

BACKGROUND ART

Recently, Bluetooth registered trademark) attracts attention as wireless communication means for short range, and various kinds of compliant equipment have been developed and marketed.

The wireless communication system using radio waves, typified by the Bluetooth has advantages such as having no directivity and having higher transparency in comparison with a conventional infrared data communication system including IrDA. It was necessary to make devices communicating with each other face adequately when using communication with strong directivity, such as IrDA. However, in the communication system including the Bluetooth, such limitation in positioning is not required.

The Bluetooth specification is under control of Bluetooth SIG, Inc., and details of the specification are available from Bluetooth SIG, Inc. For example, in the communication utilizing Bluetooth, a device called "master" for controlling the communication performs broadcast transmission of a device detection message for detecting devices existing around it.

And the master can detect the devices existing around it, that is, communicable devices, by means of a response message transmitted from a device (slave) which received the device detection message.

In addition, when establishing communication between the master and a specific one of the detected devices, the master specifies the one on the basis of identification information of each device contained in the response message and establishes the communication.

In the Bluetooth system, information called "Bluetooth address" is assigned to respective devices as information for identifying individual devices. The Bluetooth address is uniquely given to each device, the information is used for various processing including device control and the like.

It is to be noted that in the Bluetooth system, a network comprising a master and slaves is called a "piconet". A single piconet can have one master and seven slaves belonging thereto, at maximum. All the devices belonging to a single piconet are in a condition that a frequency axis (frequency hopping pattern) and a time axis (time slot) thereof are in synchronization.

Furthermore, a network in which a plurality of piconets are connected can also be configured, and this is called a "scatternet".

In addition, in the Bluetooth system, specifications referred to as "profile" which specifies data transmitted/received in wireless communication and communication steps thereof with regard to each service is established. In accordance with the profile, services available through respective devices are represented.

For example, in a PAN (Personal Area Network) profile being developed as one of the profiles, a communication method between slaves in a piconet is defined. Devices belonging to a piconet constituted in accordance with the PAN profile are allowed to transmit/receive various data through the piconet as a single network. Similarly, in a scatternet, it will be defined that various data are transmitted/received in the scatternet as a single network. This network may be a network based on an IP (Internet Protocol), for example.

And at the time of configuring such a network, details such as, which device should be a master, which device should be a slave, or through which service the communication should be carried out, are determined by the master which acquires information regarding the peripheral devices using the device detection message as described above, in accordance with an instruction from a user, for example.

However, in wireless communication using Bluetooth, a device detection message is broadcasted to all devices existing in a search range (an area having a radius of 10 meters to 100 meters, for example). Therefore, a user should check information displayed on a screen and should select, from the devices transmitting a response message to the device detection message, a device to communicate with. This is a problem of spending time as a result.

In other words, such a device selecting operation is required every time the communication is carried out, which is extremely inconvenient to the user. This problem will possibly get worse as the Bluetooth-compliant devices become popular in the future.

In addition, when actually transmitting/receiving data, the user is required to select a desired service among services notified by a target device. This also spends much time until the communication starts.

Furthermore, even after selecting the device to communicate with and the service applied between the devices, the user may require inputting a number in a predetermined digit, that is, a pass key, which is common to both the communicating devices. This input operation of the passkey is an operation needed at an initial connection between devices, especially which require ensuring of security, and this is inconvenient for carrying out communication.

Therefore, there has been a problem that, due to various factors described above, it is not easy for the user to make configuration of a communication group (network) comprising a plurality of devices based on the Bluetooth system.

DISCLOSURE OF INVENTION

The present invention is made in view of the circumstances described above, and is to enable forming a communication group comprising a plurality of devices easily and promptly in a case of communicating via Bluetooth, for example.

An information processing apparatus of a communication system of the present invention is characterized by comprising: first wireless communication means which transmits and receives predetermined information to and from an information processing terminal made close thereto through an electromagnetic wave; second wireless communication means being different from the first wireless communication means, which carries out wireless communication with the information processing terminal; memory means which stores device information including at least identification information of the apparatus itself and communication method information regarding a communication method of the wireless communication providable by the second wireless communication means; providing means which provides the device information stored in the memory means to the information processing terminal via the first wireless communication means; first synchronization establishing means which establishes synchronization of the wireless communication with the information processing terminal in accordance with a request made by the information processing terminal on the basis of the identification information provided via the providing means; and first communication establishing means which establishes the wireless communication the synchronization of which is established by the first synchronization establishing means utilizing the communication method selected by the information processing terminal in accordance with the communication method information.

In addition, an information processing terminal of a communication system is characterized by comprising: third wireless communication means which transmits and receives predetermined information to and from an information processing apparatus made close thereto through an electromagnetic wave; fourth wireless communication means being different from the third wireless communication means, which carries out wireless communication with the information processing apparatus; acquisition means which acquires device information from the information processing apparatus via the third wireless communication means; selection means which selects a communication method to be used for wireless communication by the second wireless communication means in accordance with communication method information acquired by the acquisition means; second synchronization establishing means which establishes synchronization of the wireless communication with the information processing apparatus in accordance with the identification information; and second communication establishing means which establishes the wireless communication the synchronization of which is established by the synchronization establishing means utilizing the communication method selected by the selection means.

A communication method of a communication system of the present invention is characterized by comprising the steps of: a first wireless communication step of transmitting/receiving predetermined information to and from an information processing terminal made close thereto through an electromagnetic wave; a second wireless communication step for carrying out wireless communication with an information processing terminal; a storing step of storing device information including at least identification information of the apparatus itself and communication method information regarding a communication method of the wireless communication providable by a process of the second wireless communication step; a providing step of providing the device information stored by a process of the storing step to the information processing terminal by a process of the first wireless communication step; a first synchronization establishing step of establishing synchronization of the wireless communication with the information processing terminal in accordance with a request made by the information processing terminal on the basis of the identification information provided by a process of the providing step; and a first communication establishing step of establishing the wireless communication the synchronization of which is established by a process of the first synchronization establishing step utilizing the communication method selected by the information processing terminal in accordance with the communication method information.

In addition, it is also characterized by comprising a third wireless communication step of transmitting/receiving predetermined information to and from an information processing apparatus adjacent thereto through an electromagnetic wave; a fourth wireless communication step for carrying out wireless communication with the information processing apparatus; an acquiring step of acquiring device information from the information processing apparatus by a process of the third wireless communication step; a selecting step of selecting a communication method to be used for wireless communication by a process of the second wireless communication step in accordance with communication method information acquired by a process of the acquiring step; a second synchronization establishing step of establishing synchronization of the wireless communication with the information processing apparatus in accordance with identification information; and a second communication establishing step of establishing the wireless communication the synchronization of which is established by a process of the synchronization establishing step utilizing the communication method selected by a process of the selecting step.

An information processing apparatus of the present invention is characterized by comprising: first wireless communication means which transmits and receives predetermined information to and from an information processing terminal made close thereto through an electromagnetic wave; second wireless communication means being different from the first wireless communication means, which carries out wireless communication with the information processing terminal; memory means which stores device information including at least identification information of the apparatus itself and communication method information regarding a wireless communication method providable by the second wireless communication means; providing means which provides the device information stored in the memory means to the information processing terminal via the first wireless communication means; synchronization establishing means which establishes synchronization of wireless communication between the apparatus and the information processing terminal in accordance with a request from the information processing terminal on the basis of the identification information provided via the providing means; and communication establishing means which establishes the wireless communication the synchronization of which is established by the synchronization establishing means utilizing the communication method selected by the information processing terminal in accordance with the communication method information.

The memory means stores the device information which further includes key information used in authentication for carrying out wireless communication. The providing means can provide the information processing terminal with the device information which further includes key information.

It may be arranged so that generation means which generates the key information at random is further provided, and that the memory means includes the key information generated by the generation means in the device information and stores it.

It may be arranged so that the memory means stores device information which further includes number information representing the number of devices simultaneously communicable through wireless communication, and that the providing means provides the information processing terminal with the device information including the number information.

It may be arranged so that memory means stores device information which further includes time information representing a time period communicable through wireless communication, and that the providing means provides the information processing terminal with the device information including the time information.

It may be arranged so that the memory means stores device information which further includes type information representing types of devices communicable through wireless communication, and that the providing means provides the information processing terminal with the device information including the type information.

Activation means which activates a function of the wireless communication when the device information is provided to the information processing terminal by the providing means may also be provided.

The first wireless communication means can be driven by an induced electric power generated in accordance with reception of an electromagnetic wave radiated from the information processing terminal.

It is possible to further provide memory control means which makes a predetermined wireless communication body driven by the induced electric power generated by receiving an electromagnetic wave store the device information by utilizing the communication via the first wireless communication means.

An information processing method of an information processing apparatus of the present invention is characterized by comprising: a first wireless communication step of transmitting/receiving predetermined information to and from an information processing terminal adjacent thereto through an electromagnetic wave; a second wireless communication step for carrying out wireless communication with an information processing terminal; a storing step of storing device information including at least identification information of the apparatus itself and communication method information regarding a communication method of the wireless communication providable by a step of the second wireless communication step; a providing step of providing the information processing terminal with the device information stored by a process of the storing step, by a process of the first wireless communication step; a synchronization establishing step of establishing synchronization of the wireless communication with the information processing terminal in accordance with a request from the information processing terminal on the basis of the identification information provided by a process of the providing step; and a communication establishing step of establishing the wireless communication the synchronization of which is established by a process of the synchronization establishing step utilizing the communication method selected by the information processing terminal in accordance with the communication method information.

A first program of the present invention is characterized by making a computer execute: a first wireless communication control step of controlling transmitting/receiving of predetermined information to and from an information processing terminal adjacent thereto through an electromagnetic wave; a second wireless communication control step for controlling wireless communication with an information processing terminal; a storing control step of controlling storing of device information including at least identification information of the apparatus itself and communication method information regarding a communication method of the wireless communication providable by the second wireless communication control step; a providing control step of controlling providing of the device information stored by a process of the storing control step to the information processing terminal by a process of the first wireless communication control step; a synchronization establishing control step of controlling establishing of synchronization of the wireless communication with the information processing terminal in accordance with a request from the information processing terminal on the basis of the identification information provided via a process of the providing control step; and a communication establishing control step of controlling establishing of the wireless communication the synchronization of which is established by a process of the synchronization establishing control step utilizing the communication method selected by the information processing terminal in accordance with the communication method information.

A first information processing terminal of the present invention is characterized by comprising: first wireless communication means which transmits and receives predetermined information to and from an information processing apparatus adjacent thereto through an electromagnetic wave; second wireless communication means being different from the first wireless communication means, which carries out wireless communication with the information processing apparatus; acquisition means which acquires device information including at least identification information of the information processing apparatus and communication method information regarding a communication method of the wireless communication providable by the information processing apparatus from the first wireless communication means; selection means which selects a communication method to be used for wireless communication by the second wireless communication means in accordance with the communication method information acquired by the acquisition means; synchronization establishing means which establishes synchronization of the wireless communication with the information processing apparatus in accordance with the identification information; and communication establishing means which establishes the wireless communication the synchronization of which is established by the synchronization establishing means utilizing the communication method selected by the selection means.

It is possible to make the acquisition means acquire device information which further includes key information used in authentication for wireless communication.

It may be arranged so that the acquisition means acquires device information which further includes number information representing the number of devices with which the information processing apparatus can communicate simultaneously through the wireless communication, and that the synchronization establishing means establishes synchronization when it is judged that wireless communication with the information processing apparatus is available on the basis of the number information.

It may be arranged so that the acquisition means acquires device information which further includes time information representing a time period during which the information processing apparatus can communicate through the wireless communication, and that the synchronization establishing means establishes synchronization when it is judged that wireless communication with the information processing apparatus is available on the basis of the time information.

It may be arranged so that the acquisition means acquires device information which further includes type information representing a type of a device with which the information processing apparatus can communicate through the wireless communication, and that the synchronization establishing means establishes synchronization when it is judged that wireless communication with the information processing apparatus is available on the basis of the type information.

It is possible to further provide activation means which activates a function of the wireless communication when the device information is acquired by the acquisition means.

An information processing method of the first information processing terminal of the present invention is characterized by including: a first wireless communication step of transmitting/receiving predetermined information to and from an information processing apparatus made close thereto through an electromagnetic wave; a second wireless communication step for carrying out wireless communication with the information processing apparatus; an acquiring step of acquiring device information including at least identification information of the information processing apparatus and communication method information regarding a communication method of the wireless communication providable by the information processing apparatus from the information processing apparatus by a process of the first wireless communication means; a selecting step of selecting a communication method to be used for wireless communication by a process of the second wireless communication step in accordance with the communication method information acquired by a process of the acquiring step; a synchronization establishing step of establishing synchronization of the wireless communication with the information processing apparatus in accordance with the identification information; and a communication establishing step of establishing the wireless communication the synchronization of which is established by a process of the synchronization establishing step utilizing the communication method selected by a process of the selecting step.

A second program of the present invention is characterized by making a computer execute: a first wireless communication control step of controlling transmitting/receiving of predetermined information to and from an information processing apparatus adjacent thereto through an electromagnetic wave; a second wireless communication control step for controlling wireless communication with the information processing apparatus; an acquiring control step of controlling acquiring of device information including at least identification information of the information processing apparatus and communication method information regarding a communication method of the wireless communication providable by the information processing apparatus from the information processing apparatus by a process of the first wireless communication control means; a selecting step of selecting a communication method to be used for wireless communication by a process of the second wireless communication control step in accordance with the communication method information acquired by a process of the acquiring control step; a synchronization establishing control step of controlling establishing of synchronization of the wireless communication with the information processing apparatus in accordance with the identification information; and a communication establishing control step of controlling establishing of the wireless communication the synchronization of which is established by a process of the synchronization establishing control step utilizing the communication method selected by a process of the selecting step.

A second information processing terminal of the present invention is characterized by comprising: acquisition means which acquires device information including at least identification information of a predetermined information processing apparatus stored in a wireless communication body and communication method information regarding a communication method of the wireless communication providable by the information processing apparatus, when the wireless communication body which is driven depending on an induced electric power generated in accordance with receiving an electromagnetic wave approaches; wireless communication means which carries out wireless communication with the information processing apparatus; selection means which selects, depending on the communication method information acquired by the acquisition means, a communication method to be used for the wireless communication by the wireless communication means; synchronization establishing means which establishes synchronization of the wireless communication with the information processing apparatus in accordance with the identification information; and communication establishing means which establishes the wireless communication the synchronization of which is established by the synchronization establishing means utilizing the communication method selected by the selection means.

An information processing method of the second information processing terminal of the present invention is characterized by including: an acquiring step of acquiring device information including at least identification information of a predetermined information processing apparatus stored in a wireless communication body and communication method information regarding a communication method of wireless communication providable by the information processing apparatus, when the wireless communication body which is driven depending on an induced electric power generated in accordance with receiving an electromagnetic wave approaches; a wireless communication step for carrying out wireless communication with the information processing apparatus; a selecting step of selecting a communication method to be used for wireless communication by a process of the wireless communication step in accordance with the communication method information acquired by a process of the acquiring step; a synchronization establishing step of establishing synchronization of the wireless communication with the information processing apparatus in accordance with the identification information; and a communication establishing step of establishing the wireless communication the synchronization of which is established by a process of the synchronization establishing step utilizing the communication method selected by a process of the selecting step.

A third program of the present invention is characterized by making a computer execute: an acquiring control step of controlling acquiring of device information including at least identification information of a predetermined information processing apparatus stored in a wireless communication body and communication method information regarding a communication method of the wireless communication providable by the information processing apparatus, when the wireless communication body which is driven depending on an induced electric power generated in response to receiving an electromagnetic wave approaches; a wireless communication control step for controlling wireless communication with the information processing apparatus; a selecting step of selecting a communication method to be used for wireless communication by a process of the wireless communication control step in accordance with the communication method information acquired by a process of the acquiring control step; a synchronization establishing control step of controlling establishing of synchronization of the wireless communication with the information processing apparatus in accordance with the identification information; and a communication establishing control step of controlling establishing of the wireless communication the synchronization of which is established by a process of the synchronization establishing control step utilizing the communication method selected by a process of the selecting step.

In the communication system and method of the present invention, the device information including at least the identification information of the device itself, and, the communication method information regarding the communication method of the wireless communication providable is stored; the device information stored is provided to the information processing terminal; and synchronization of the wireless communication with the information processing terminal is established in accordance with a request from the information processing terminal depending on the provided identification information. Then, the wireless communication whose synchronization has been established is established using the communication method selected by the information processing terminal depending on the communication method information. Furthermore, the device information including at least the identification information of the information processing apparatus and the communication method information regarding the communication method of the wireless communication providable by the information processing apparatus is acquired from the information processing apparatus, and the communication method to be used for the wireless communication is selected in accordance with the acquired communication method information. Then, synchronization of the wireless communication with the information processing apparatus is established in accordance with the identification information, and the wireless communication the synchronization of which has been established is established utilizing the selected communication method.

In the information processing apparatus and the method, and the program of the present invention, the device information including at least the identification information of the device itself, and, the communication method information regarding the communication method of the wireless communication providable is stored, and the device information stored is provided to the information processing terminal. In addition, synchronization of the wireless communication with the information processing terminal is established in accordance with a request from the information processing terminal depending on the provided identification information, and the wireless communication the synchronization of which has been established is established using the communication method selected by the information processing terminal depending on the communication method information.

In the first information processing terminal and the method, and the program of the present invention, the device information including at least the identification information of the information processing apparatus and the communication method information regarding the communication method of the wireless communication providable by the information processing apparatus is acquired from the information processing apparatus, and the communication method to be used for the wireless communication is selected in accordance with the acquired communication method information. In addition, synchronization of the wireless communication is established with the information processing apparatus in accordance with the identification information, and the wireless communication the synchronization of which has been established is established utilizing the selected communication method.

In the second information processing terminal and the method, and the program of the present invention, when a wireless communication body driven by the induced electric power generated by receiving an electromagnetic wave approaches, the device information including at least the identification information of the predetermined information processing apparatus and the communication method information regarding the communication method of the wireless communication providable by the information processing apparatus, which is stored in the wireless communication body, is acquired via the electromagnetic wave, the communication method to be used for the wireless communication is selected in accordance with the acquired communication method information. In addition, synchronization of the wireless communication is established with the information processing apparatus in accordance with the identification information, and the wireless communication the synchronization of which has been established is established utilizing the selected communication method.

BRIEF DESCRIPTION OF DRAWINGS

FIG. 9 is a figure which shows an example of device information.

BEST MODE FOR CARRYING OUT THE INVENTION

Figure 1:
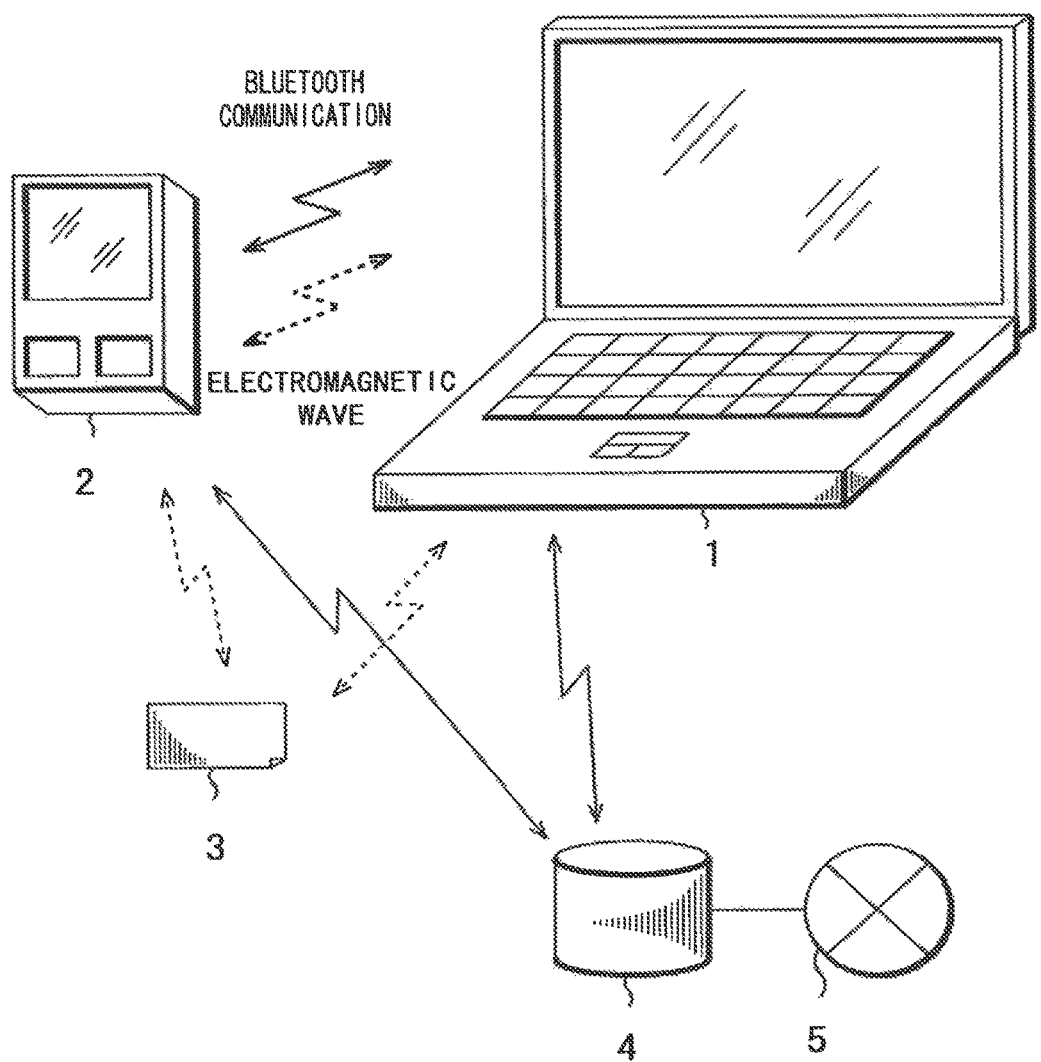
FIG. 1 is a figure which shows a structural example of a communication system to which the present invention is applied.

FIG. 1 is a figure which shows a structural example of a communication system to which the present invention is applied.

Each of a personal computer 1, a PDA (Personal Digital Assistants) 2 and an access point 4 as shown in FIG. 1 has a Bluetooth module built therein. As shown in a solid line arrow in the figure, the devices mutually transmits and receives various data among them via wireless communication in conformity with the Bluetooth standard.

In addition, the personal computer 1 and the PDA 2 are provided with a reader/writer capable of reading and writing various data from and onto a contactless IC card 3. This reader/writer is also capable of reading and writing various data to and from other reader/writers provided to the other devices. Therefore, the personal computer 1 and the PDA 2 can communicate with each other not only via the Bluetooth communication but also via an electromagnetic wave radiated from the reader/writer thereof as shown with a dotted line arrow in the figure.

Although detailed processing will be described later with reference to flow charts, when a user brings the PDA 2 close to the personal computer 1 and an electromagnetic wave radiated from a reader/writer (contactless IC card reader/writer 108 (see FIG. 5)) of the PDA 2 is received, a reader/writer (contactless IC card reader/writer 19 (see FIG. 2)) of the personal computer 1 provides device information already set therein to the PDA 2 (contactless IC card reader/writer 108).

The device information contains Bluetooth addresses as information identifying a Bluetooth module (Bluetooth module 20 (see FIG. 2)) of the personal computer 1 carrying out Bluetooth communication. The Bluetooth address is information uniquely assigned to each Bluetooth module of the personal computer 1, the PDA 2, the access point 4 and the like.

The PDA 2 which acquired device information of the personal computer 1 identifies only the personal computer 1 from Bluetooth devices existing around it using this device information, and establishes Bluetooth communication with the personal computer 1.

As a result of the above processing, for example, it is possible for the user of the PDA 2 to start Bluetooth communication by simply making the PDA 2 close to the personal computer 1 without making the PDA 2 execute an "Inquiry" which will be described later and is a general processing in Bluetooth communication or without operation of selecting the personal computer 1 as a communication destination from devices detected by the PDA 2.

In addition, when the user brings the PDA 2 close to the contactless IC card 3 and the contactless IC card 3 receives an electromagnetic wave radiated from the PDA 2, the contactless IC card 3 provides device information preliminarily set to the PDA 2.

For example, device information of the contactless IC card 3 relates to the access point 4 and, similar to the case of starting Bluetooth communication with the personal computer 1, the PDA 2 establishes Bluetooth communication with the access point 4 on the basis of the device information.

This access point 4 is connected to a network 5 so that the user can make the PDA 2 connected to the network 5 by simply making the PDA 2 close to the contactless IC card 3, or conversely, simply making the contactless IC card 3 close to the PDA 2. In other words, the user of the PDA 2 can use various contents introduced on the network 5 through the PDA 2.

In addition, in a similar way, a user of the personal computer 1 can also establish communication between the personal computer 1 and the access point 4 and use the various contents by simply making the contactless IC card 3 close to the contactless IC card reader/writer 19.

As described above, since the Bluetooth communication with the access point 4 is established via the contactless IC card 3, even in a case where the access point 4 is not provided in the vicinity of the personal computer 1 or the PDA 2, communication between the access point 4 and the personal computer 1 or the PDA 2 can be easily started.

Next, each constitution of the communication system of FIG. 1 will be described.

Figure 2:
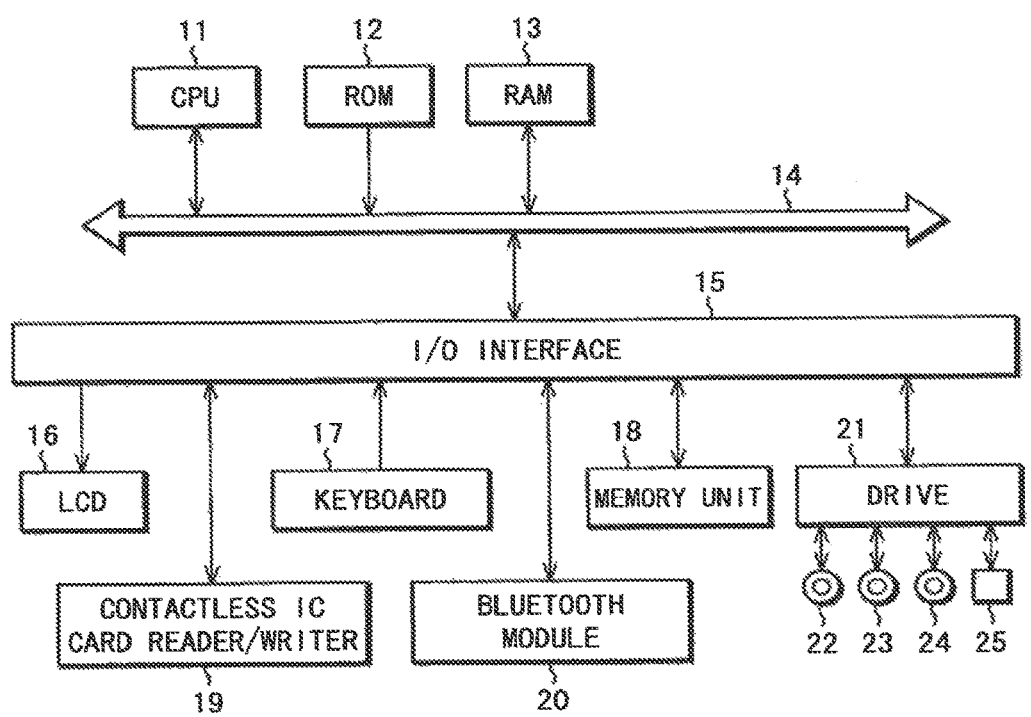
FIG. 2 is a block diagram which shows a structural example of a personal computer of FIG. 1.

FIG. 2 is a block diagram which shows a structural example of the personal computer 1 of FIG. 1.

A CPU (Central Processing Unit) 11 carries out various processing in accordance with a program stored in a ROM (Read Only Memory) 12 or in a memory unit 18. Programs and data to be executed by the CPU 11 are accordingly stored in a RAM 13. The CPU 11, the ROM 12 and the RAM 13 are mutually connected via a bus 14.

An input/output interface 15 is connected to the bus 14. An LCD (Liquid Crystal Display) 16, a keyboard 17 operable by the user, the memory unit 18 constituted with a hard disk or the like are connected to the input/output interface 15, for example.

In addition, the contactless IC card reader/writer 108 built in the PDA 2 or the contactless IC card reader/writer 19 which communicates with the contactless IC card 3 via an electromagnetic wave, and the Bluetooth module 20 which communicates with the Bluetooth module of the PDA 2 or the access point are connected to the input/output interface 15.

Furthermore, a drive 21 is also connected to the input/output interface 15. A magnetic disk 22, an optical disc 23, a magneto-optical disc 24 or a semiconductor memory can be loaded to the drive 21 accordingly. A program read out from these magnetic disk 22 to semiconductor memory 25 is provided to the memory unit 18, for example, through the drive 21 to the input/output interface 15, and is stored therein.

Figure 3:
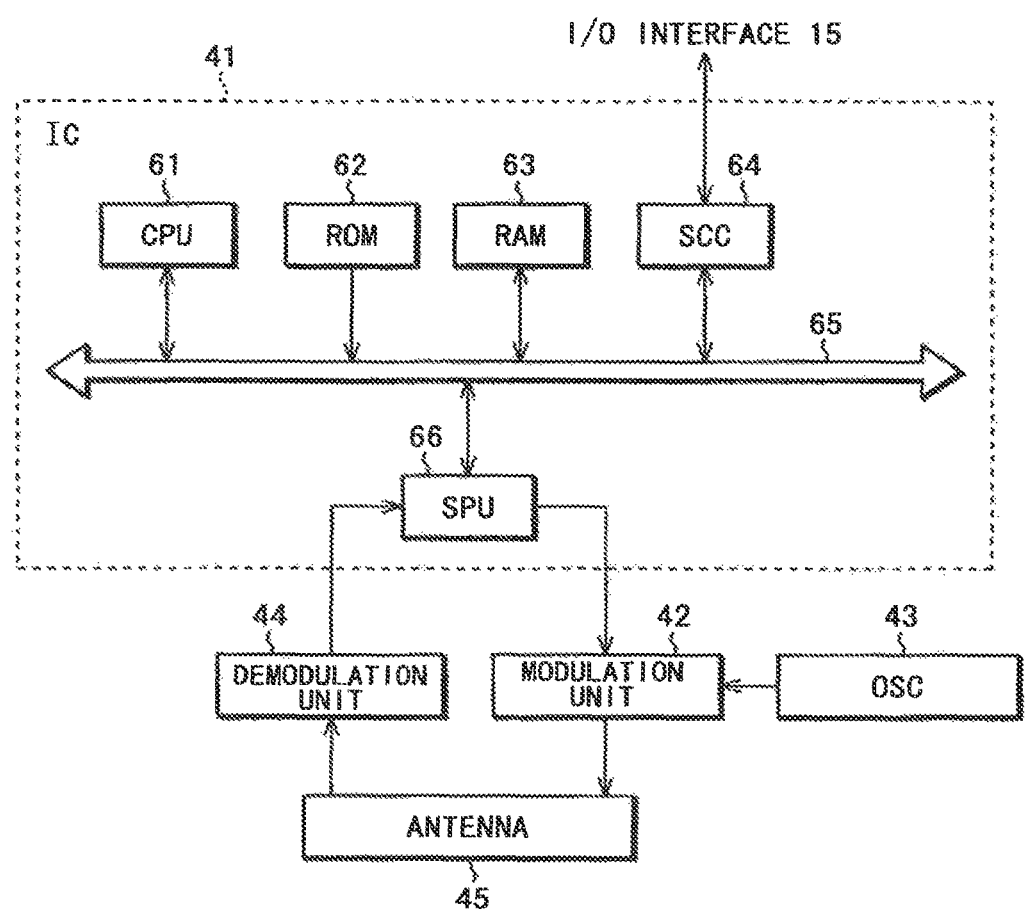
FIG. 3 is a block diagram which shows a structural example of an IC card reader/writer of FIG. 2.

FIG. 3 is a block diagram which shows a detailed structural example of the contactless IC card reader/writer 19 (hereinafter, referred to as "reader/writer 19" accordingly) of FIG. 2.

An IC 41 is constituted with a CPU 61, a ROM 62, a RAM 63, an SCC (Serial Communication Controller) 64, an SPU (Signal Processing Unit) 66 and a bus 65 connecting these elements including the CPU 61 to the SPU 66 mutually.

The CPU 61 develops a control program stored in the ROM 62 to the RAM 63, and executes various processing in accordance with response data transmitted from the contactless IC card 3 or a control signal provided from the CPU 11 of FIG. 2, for example. For example, the CPU 61 generates a command to transmit to the contactless IC card 3 and output the command to the SPU 66 via the bus 65 or carries out an authentication processing of data transmitted from the contactless IC card 3.

In addition, when the contactless IC card 3 approaches the CPU 61 and the CPU 61 is notified of device information in accordance with processing by each unit described later, the CPU 61 carries out a process including notifying the Bluetooth module 20 of the device information in response to an instruction from the CPU 21.

The SCC 64 provides the data provided from the CPU 11 of FIG. 2 to the CPU 61 through the bus 65 or outputs the data provided from the CPU 61 through the bus 65 to the CPU 11.

When the response data from the contactless IC card 3 is provided from a demodulation unit 44, the SPU 66 performs BPSK (Binary Phase Shift Keying) demodulation (decoding of a Manchester code), for example, and provides obtained data to the CPU 61. In addition, when the command to be transmitted to the contactless IC card 3 is provided through the bus 65, the SPU 66 performs BPSK (Binary Phase Shift Keying) modulation (coding to the Manchester code) on the command and outputs obtained data to a modulation unit 42.

The modulation unit 42 modulates a carrier wave of a predetermined frequency (13.56 MHz, for example) provided from an oscillation circuit (OSC) 43 in accordance with the data provided from the SPU 66, and outputs a generated modulated wave from an antenna 45 as an electromagnetic wave. On the other hand, the modulation unit 44 demodulates the modulated wave (ASK modulated wave) obtained through the antenna 45, and outputs demodulated data to the SPU 66.

The antenna 45 radiates a predetermined electromagnetic wave, and, in response to a change of load against it, detects whether or not the contactless IC card 3 or the contactless IC card reader/writer 108 of the PDA 2 approaches. For example, when the contactless IC card 3 approaches, the antenna 45 transmits and receives various data to and from the contactless IC card 3.

Incidentally, since the contactless IC card reader/writer 108 of the PDA 2 also has a construction similar to the reader/writer 19 shown in FIG. 3, hereinafter, a CPU of the contactless IC card reader/writer 19 is referred to as a CPU 61A and a CPU of the contactless IC card reader/writer 108 is referred to as a CPU 61B accordingly. The other elements of the constitution are similarly referred.

Figure 4:
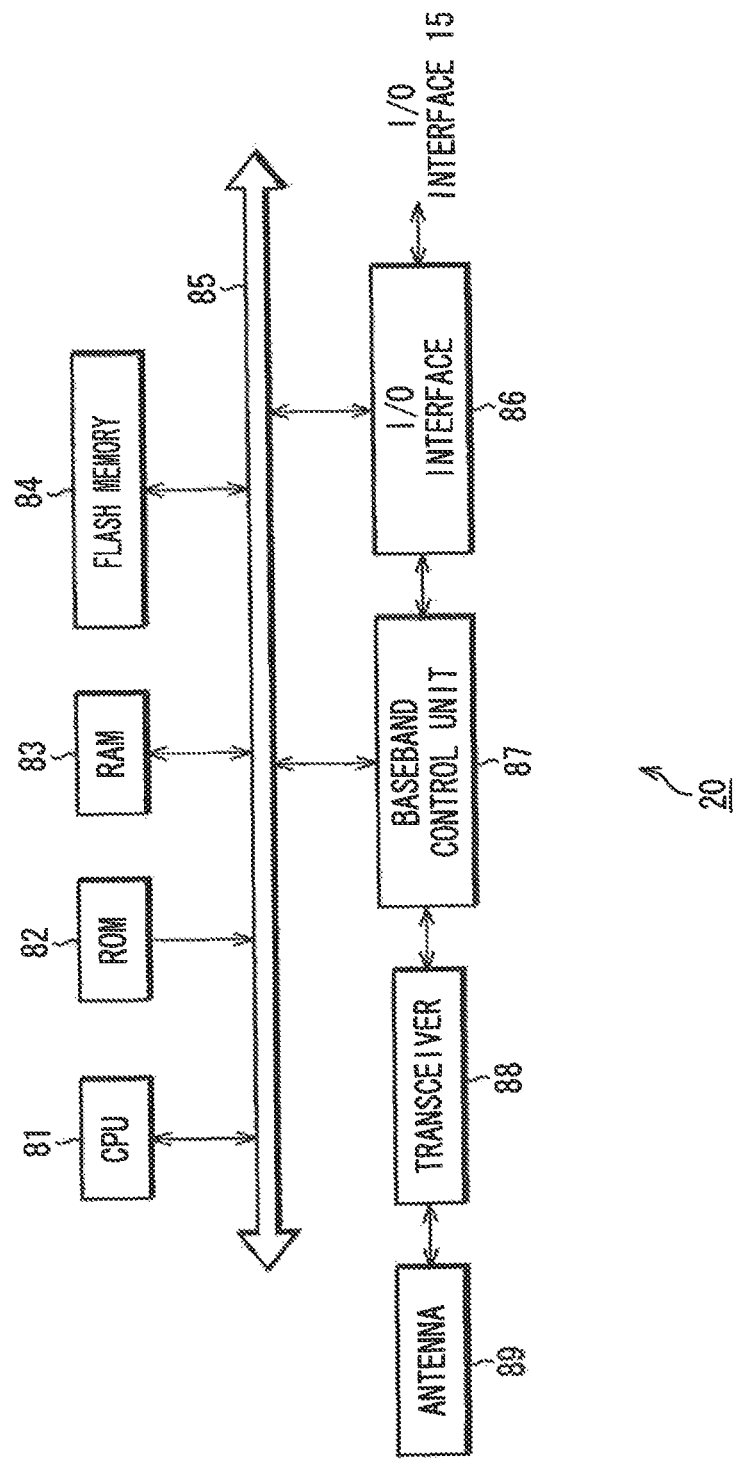
FIG. 4 is a block diagram which shows a structural example of a Bluetooth module of FIG. 2.

FIG. 4 is a block diagram which shows a detailed structural example of the Bluetooth module of FIG. 2.

A CPU 81 develops a control program stored in a ROM 82 to a RAM 83, and control operation of the whole Bluetooth module 20. These elements of the CPU 81 to the RAM 83 are connected mutually through a bus 85. A flash memory 84 is also connected to the bus 85.

The flash memory 84 stores, for example, a Bluetooth device name individually set to each Bluetooth device, and, a Bluetooth address uniquely assigned to each Bluetooth device, and the like.

Since the Bluetooth address is an identifier of 48 bits, and is peculiarly (uniquely) given to each Bluetooth device, it is used for various processing regarding managing of the Bluetooth devices.

For example, to establish synchronization within a piconet, it is required that all slaves obtain information regarding a frequency hopping pattern of a master, and the frequency hopping pattern is calculated by the slave on the basis of the Bluetooth address of the master.

In more detail, a Bluetooth address is divided into a LAP (Low Address Part) with its lower 24 bits, a UAP (Upper Address Part) with 8 bits subsequent thereto, and an NAP (Non-significant Address Part) with remaining 16 bits. Twenty eight bits comprising the 24 bits of the whole LAP and the lower 4 bits of the UAP are used for calculating the frequency hopping pattern.

Each slave can calculate the frequency hopping pattern in accordance with the above-mentioned portion of 28 bits of the Bluetooth address obtained by "Page" for establishing the synchronization within the piconet and the Bluetooth address of the master obtained as the device information from the reader/writer 19, and a Bluetooth clock notified by the master in a similar way.

Now, explanation returns to FIG. 4. The flash memory 84 stores a link key or the like for authenticating a destination Bluetooth device or encrypting data to transmit after establishing the synchronization within the piconet and provides it to the CPU 81 on demand.

An input-output interface 86 controls input/output of data provided from the CPU 11 of FIG. 1 and data provided from a baseband control unit 87 in accordance with an instruction from the CPU 81.

The baseband control unit 87 carries out various kinds of control including control of a transceiver 88, control of a link, control of a packet, control of a logical channel, and control of security and processing including error correction, encoding, decoding or randomizing of data, analog-converts data provided from the input/output interface 86 so as to output to the transceiver 88, and outputs data obtained by digital-converting a signal provided from the transceiver 88 to the input-output interface 86.

The transceiver 88 is constituted with a GFSK (Gaussian Frequency Shift Keying) modulation unit, a GFSK demodulation unit, a spectrum diffusion unit, a reverse spectrum diffusion unit or a hopping synthesizer unit and the like, performs various kinds of processing onto a signal provided from the baseband control unit 87 to output to an antenna 89, and performs various kinds of processing onto a signal provided from the antenna 89 to output an obtained signal to the baseband control unit 87.

The GFSK modulation unit constituting the transceiver 88 limits a high pass component of data provided from the baseband control unit 87, carries out frequency modulation as a primary modulation, and outputs obtained data to the spectrum diffusion unit. The spectrum diffusion unit switches a carrier frequency on the basis of the frequency hopping pattern calculated as described above and notified from the hopping synthesizer unit, and outputs a signal obtained after performing spectrum diffusion on data provided thereto to the antenna 89. In Bluetooth communication, the spectrum diffusion unit carries out hopping on the frequency every 625 microseconds and transmits data.

In addition, the reverse spectrum diffusion unit constituting the transceiver 88 carries out hopping on a receiving frequency on the basis of the frequency hopping pattern notified from the hopping synthesizer unit, and, for example, obtains a signal transmitted from the PDA 2. In addition, the reverse spectrum diffusion unit performs reverse spectrum diffusion on an obtained signal and outputs the obtained signal to the GFSK demodulation unit after reproducing a signal from the PDA 2. The GFSK demodulation unit performs GFSK demodulation on a signal provided from the reverse spectrum diffusion unit and outputs obtained data to the baseband control unit 87.

The transceiver 88 transmits the spectrum diffused signal from the antenna 89 using 2.4 GHz band. In addition, the transceiver 88 outputs a receive signal from the antenna 89 to the reverse spectrum diffusion unit.

Incidentally, since the Bluetooth module 109 of the PDA 2 also has a similar structure to the Bluetooth module 20 as shown in FIG. 4, hereinafter, a CPU of the Bluetooth module 20 is referred to as a CPU 81A and a CPU of the Bluetooth module 109 is referred to as a CPU 81B accordingly. The other elements of the constitution are similarly referred.

Figure 5:
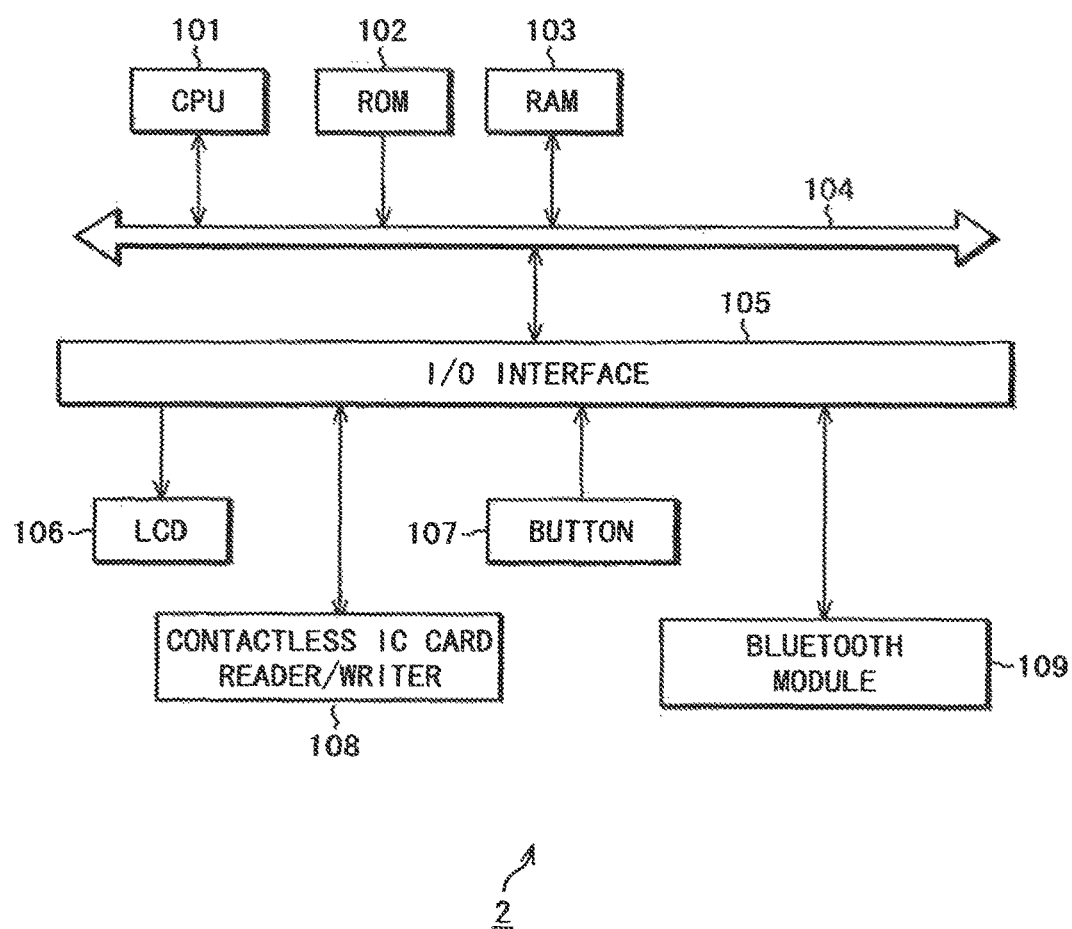
FIG. 5 is a block diagram which shows a structural example of a PDA of FIG. 1.

FIG. 5 is a block diagram which shows a structural example of the PDA 2 of FIG. 1.

Elements including a CPU 101 to the Bluetooth module 109 are basically similar to the elements including the CPU 11 to the Bluetooth module 20 of the personal computer 1 of FIG. 2, and detailed description is omitted herein.

When receiving an instruction from the user, the contactless IC card reader/writer 108 (herein, referred to as "reader/writer 108" accordingly) radiates an electromagnetic wave for detecting the contactless IC card 3 and the reader/writer 19 of the personal computer 1 at a predetermined interval. When these devices approach the PDA 2 and the PDA 2 detects them, the PDA 2 carries out communication with them via the electromagnetic wave. Device information or the like obtained by the reader/writer 108 is, for example, output to the Bluetooth module 109.

Figure 6:
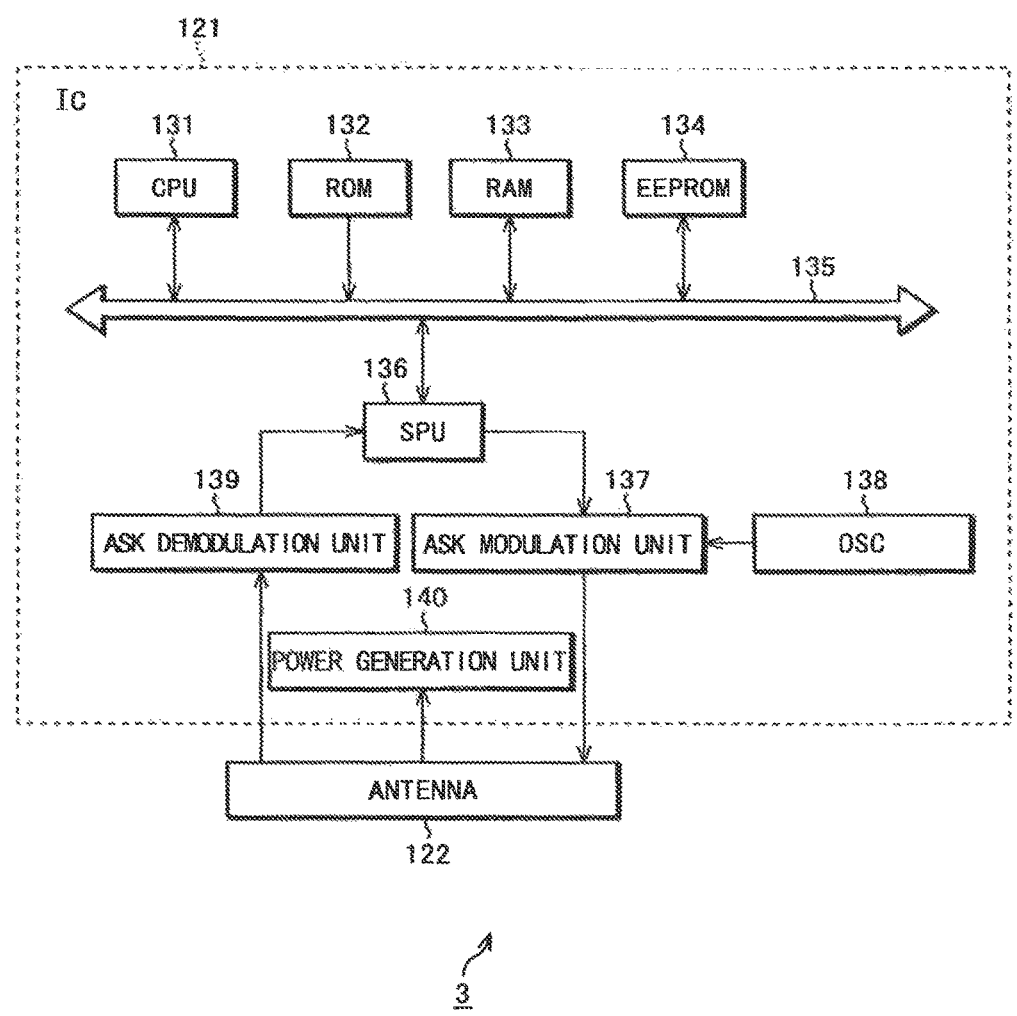
FIG. 6 is a block diagram which shows a structural example of a contactless IC card of FIG. 1.

FIG. 6 is a block diagram which shows a structural example of the contactless IC card 3 of FIG. 1.

The contactless IC card 3 comprises, for example, an antenna (a loop antenna) 122 and an IC 121 including remaining structural elements stored in a single chip, as shown in the figure, and carries out half duplex communication of various data with the reader/writer 19 of the personal computer 1, for example, using electromagnetic induction.

It should be noted that the term "contactless IC card 3" is adopted for the convenience of explanation, and it means a module having functions described above or described later. In addition, it is not always necessary for the contactless IC card 3 to be a card-shaped one. It may be a sticker-like one having adhesiveness on its back or one embedded in a back or a surface of a sheet of paper, for example. Those having functions basically similar to the contactless IC card 3 include "Felica" (registered trademark), for example.

A CPU 131 develops a control program stored in a ROM 132 onto a RAM 133, and controls operation of whole contactless IC card 3. For example, when the CPU 131 receives an electromagnetic wave radiated from the reader/writer 19 of the personal computer 1 through the antenna 122, the CPU 131 notifies, in response thereto, the reader/writer 19 of device information set in an EEPROM (Electrically Erasable and Programmable Read Only Memory) 134.

Setting of the device information stored in the EEPROM 134 can be freely changed by the reader/writer. In addition, it may be arranged so that external setting change requires predetermined authentication.

In a case where data demodulated in an ASK demodulation unit 139 is BPSK modulated, an SPU 136 performs demodulation (decoding the Manchester code) on the data in accordance with a clock signal provided from a not-shown PLL unit, and accordingly outputs the demodulated data to the CPU 131 via a bus 135.

In addition, the SPU 136 performs BPSK modulation (coding to the Manchester code) on data provided through the bus 135, and outputs resultant data to an ASK modulation unit 137.

In a case of transmitting data such as device information to the reader/writer 19, the ASK modulation unit 137 switches ON/OFF a predetermined switching device, for example, in accordance with data provided from the SPU 136. Only when the switching device is on, a predetermined load is connected to the antenna 122 in parallel so as to change the load of the antenna 122.

The ASK modulation unit 137 performs ASK modulation on a modulated wave from the reader/writer 19, for example, received through the antenna 122 in accordance with the change of the load thereof, and transmits the modulated component to the reader/writer 19 through the antenna 122 (changes a terminal voltage of the antenna 45 of the reader/writer 19) (load switching method).

The ASK demodulation unit 139 performs envelope detection on the modulated wave (ASK modulated wave) received through the antenna 122 to demodulate it and outputs demodulated data to the SPU 136. In the antenna 122, there occurs resonance due to an electromagnetic wave of a predetermined frequency radiated from the reader/writer 19, for example.

A power source generation unit 140 rectifies and stabilizes an AC magnetic field activated in the antenna 122, and then, provides it to each unit as a DC power source. For example, power of the electromagnetic wave radiated from the reader/writer 19 of the personal computer 1 or the like is adjusted to generate a magnetic field covering power required for the contactless IC card 3.

Figure 7:
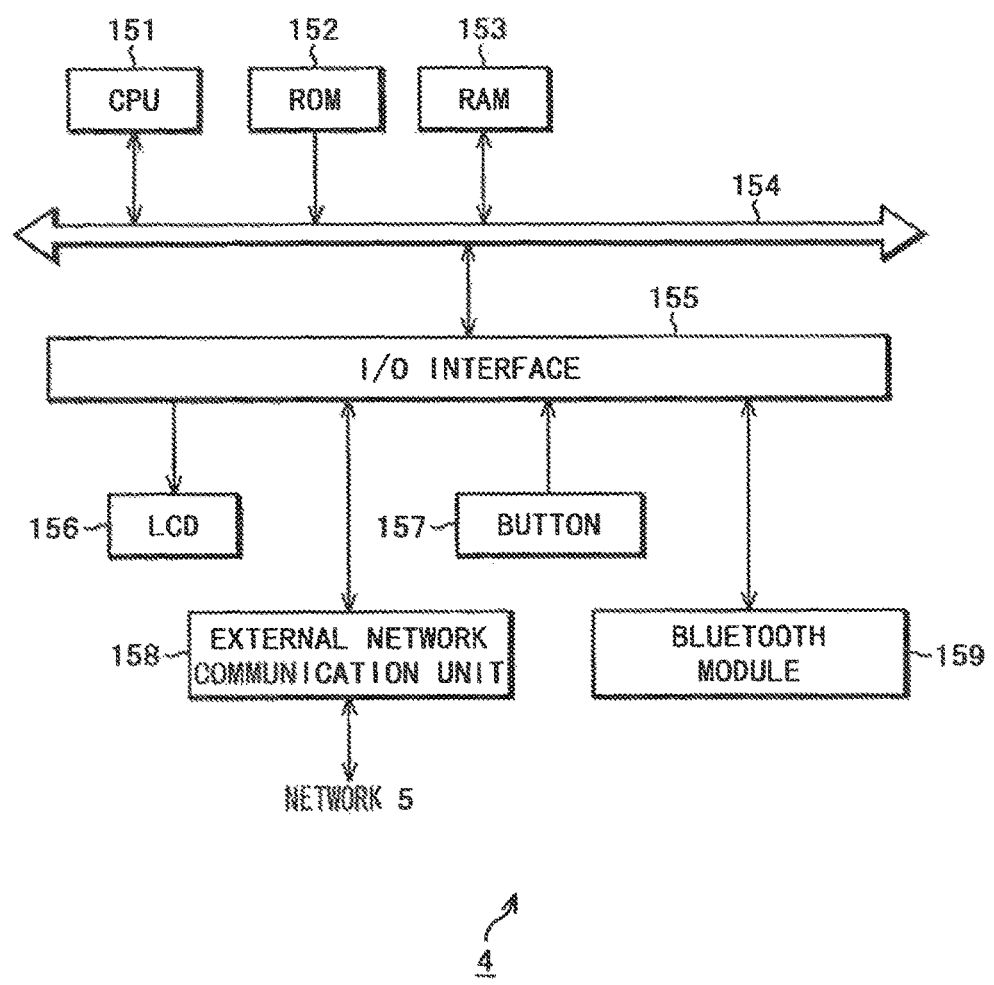
FIG. 7 is a block diagram which shows a structural example of an access point of FIG. 1.

FIG. 7 is a block diagram which shows a structural example of the access point 4 of FIG. 1.

Elements including a CPU 151 to a button 157, and a Bluetooth module 159 are basically similar to the elements including the CPU 101 to the button 107, and the Bluetooth module 109 of the PDA 2, and detailed description is omitted herein.

An external network communication unit 158 is configured with, for example, a modem and a terminal adapter, and provides various information obtained from the network 5 to the Bluetooth module 159 in accordance with an instruction from the CPU 151. The data output to the Bluetooth module 159 are transmitted to the Bluetooth module 109 of the personal computer 1, for example.

In addition, the external network communication unit 158 transmits the data provided from the Bluetooth module 159 to another external network in accordance with an instruction from the CPU 151 accordingly.

The network 5 to which the external network connection unit 158 is connected is the Internet or LAN (Local Area Network).

Next, operation of the communication system of FIG. 1 will be described.

First, with reference to a flow chart of FIG. 8, processing of the PDA 2 which acquires the device information of the personal computer 1 and executes processing for starting Bluetooth communication will be described.

In step S1, the CPU 101 of the PDA 2 determines whether or not the button 107 is operated by a user to instruct starting radiation of an electromagnetic wave, and the CPU 101 waits until it is determined yes. When the CPU 101 determines that the radiation of the electromagnetic wave is instructed, the process goes to step S2, and the CPU 101 controls the reader/writer 108 to start radiation of the electromagnetic wave. As a matter of course, an electromagnetic wave may be radiated constantly or at a predetermined interval.

In step S3, the CPU 101 determines whether or not a device having a reader/writer or the contactless IC card 3 is detected on the basis of an output from the reader/writer 108, and waits until it is determined yes. For example, the PDA 2 approaches the personal computer 1 and the reader/writer 19 of the personal computer receives the electromagnetic wave, information indicating that the reception of the electromagnetic wave is transmitted and the CPU 101 determines whether or not the device is detected on the basis of the response. In a case where it is determined that there is no response in step S3, the process of FIG. 8 may be terminated after a predetermined time period or performing radiation of electromagnetic waves of a predetermined number of times.

When the CPU 101 determines that the device is detected in step S3, the process goes to step S4.

In step S4, the CPU 101 requests the reader/writer 19 of the personal computer 1 to transmit device information. As described above, the device information is used for identifying the personal computer 1 or selecting a service, at the time of establishing Bluetooth communication.

In step S5, the CPU 101 determines whether or not the device information is transmitted on the basis of an output from the reader/writer 108, and waits until it is determined yes. In a case where the CPU 101 determines that the device information is transmitted in step S5, the process goes to step S6 and the device information is stored in the RAM 103, for example.

FIG. 9 is a figure showing an example of device information notified from the personal computer 1.

A Bluetooth address indicated in the device information in FIG. 9 is used by the PDA 2 for identifying the personal computer 1 or for managing frequency hopping patterns or the like, for example. In this example, a Bluetooth address of the personal computer 1 is "08:00:46:21:39:4D", for example.

A device class is information indicating a device type (device class) of the personal computer 1, and in FIG. 9, it is indicated to be "a personal computer". In addition to the "personal computer", general devices including "cellular phone" and "PDA" are also defined in advance.

A device name (Bluetooth device name) is information set so that a user can identify individual device, and the user can arbitrary change setting thereof.

In this example, the device name of the personal computer 1 is set to be "VAIE".

In addition, a pass key is preliminarily prepared for the device information of FIG. 9. Generally, devices communicate with each other through Bluetooth at the first time need to input the same pass key to both the devices for performing authentication. In this example, the pass key is included in the device information and the device of a communication destination is notified of the information. Therefore, since the pass key is included in the device information to be notified to the destination device and authentication is carried out on the basis of the information, it is possible for the user to save labor for inputting the pass key even in the case of first communication opportunity. In this example, a pass key of "0123456" is preliminarily prepared for the personal computer 1.

A link key is generated between devices which have already communicated through Bluetooth, and is stored in the personal computer 1 in correspondence with the Bluetooth address of the device. In this example, it is set to be "KA".

A service database (service record) is information indicating a service which the personal computer 1 can provide at that time. Generally, the service record comprises a plurality of service attributes, and further, each of the service attributes comprises a combination of an attribute ID and its attribute value. The attribute ID is set for every attribute name, and contents indicated by the attribute value and data type are made in correspondence thereto. These attribute ID and attribute name include those commonly used for all profiles defined in Bluetooth and those independently used for each profile, and the device providing the service presents them as appropriate. In addition, in the example of FIG. 9, service attributes 1 to 3 are described as the service record.

Here the attribute ID, the attribute value thereof and contents of information indicated by the attribute value will be described.

For example, "Service Class ID List" (attribute name) designated by an attribute ID "0x0001" indicates the service class to which the service record belongs. The service class is preliminarily defined for identifying a specific service, and those including serial communication, LAN access via PPP (Point-to-Point Protocol) or dial-up communication, or the like is defined.

"Protocol Descriptor List" (attribute name) designated by an attribute ID "0x0004" indicates protocol stack constitution used for accessing a service indicated in the service record.

"Language Base Attribute ID List" (attribute name) designated by an attribute ID "0x0006" is information for supporting an attribute responsive to a plurality of languages.

"Documentation URL" (attribute name) designated by an attribute ID "0x000A" represents a URL of a document with regard to a service described in the service record.

"Service Name" (attribute name) designated with an attribute ID "0x0000+attribute ID base" represents a character string indicative of a name of a service described in the service record.

Incidentally, the attribute ID base is information included in "Language Base Attribute ID List" described above and is adapted to be capable of coping with a plurality of languages.

"Service Description" (attribute name) designated with an attribute ID "0x0001+attribute ID base" is a character string having a brief description regarding the service.

And, among these information, for example, the "Service Class ID List" designated with the attribute ID "0x0001", the "Language Base Attribute ID List" designated with the attribute ID "0x0006" and the "Service Name" designated with the attribute ID "0x0001+attribute ID base" are included in the device information as communication method information, and are notified of from the personal computer 1.

Incidentally, depending on the kind of service connecting through Bluetooth, there may be one requiring selection of dynamically varying information such as channel numbers. Therefore, it may be arranged so that such dynamically varying information is acquired in accordance with SDP (Service Discovery Protocol) defined in Bluetooth, after establishing a communication link.

A connectable number is information indicating the number of devices connectable (communicable) with the personal computer 1 at the same time, and the PDA 2 which acquired the device information as shown in FIG. 9 can determine whether or not it is currently connectable to the personal computer 1 with reference to the value.

In this example, two more devices are connectable to the personal computer 1 in addition to the one which has already been in communication with the personal computer 1. The value is reduced one by one every time a device is connected to the personal computer 1.

Connection effective time is information indicating a time zone that a device can connect to the personal computer 1. In this example, it is arranged so that the device can be connected only for a time period from 00:00 to 12:00 Japan Standard Time (JST).

A connectable device is information indicating the device class which is connectable to the personal computer 1. In this example, "personal computer" is set to be a first device class, "PDA" a second device class, and "cellular phone" a third device class.

A URL (Uniform Resource Locator) is information specifying a WWW (World Wide Web) page where detailed information about the personal computer 1 is described. Therefore, a user of the PDA 2 can browse the detailed information including the services providable by the personal computer 1 by acquiring the device information as shown in FIG. 9 and checking the WWW page specified by the URL.

In addition, the WWW page specified by the URL of the device information may be a page through which various operations are available on the personal compute 1. For example, it may be arranged so that the user of the PDA 2 can confirm a current status and a used status of the personal computer 1 by checking this page.

The PDA 2 may request transmitting all of device information as described above, or transmitting the device information separately.

Figure 8:
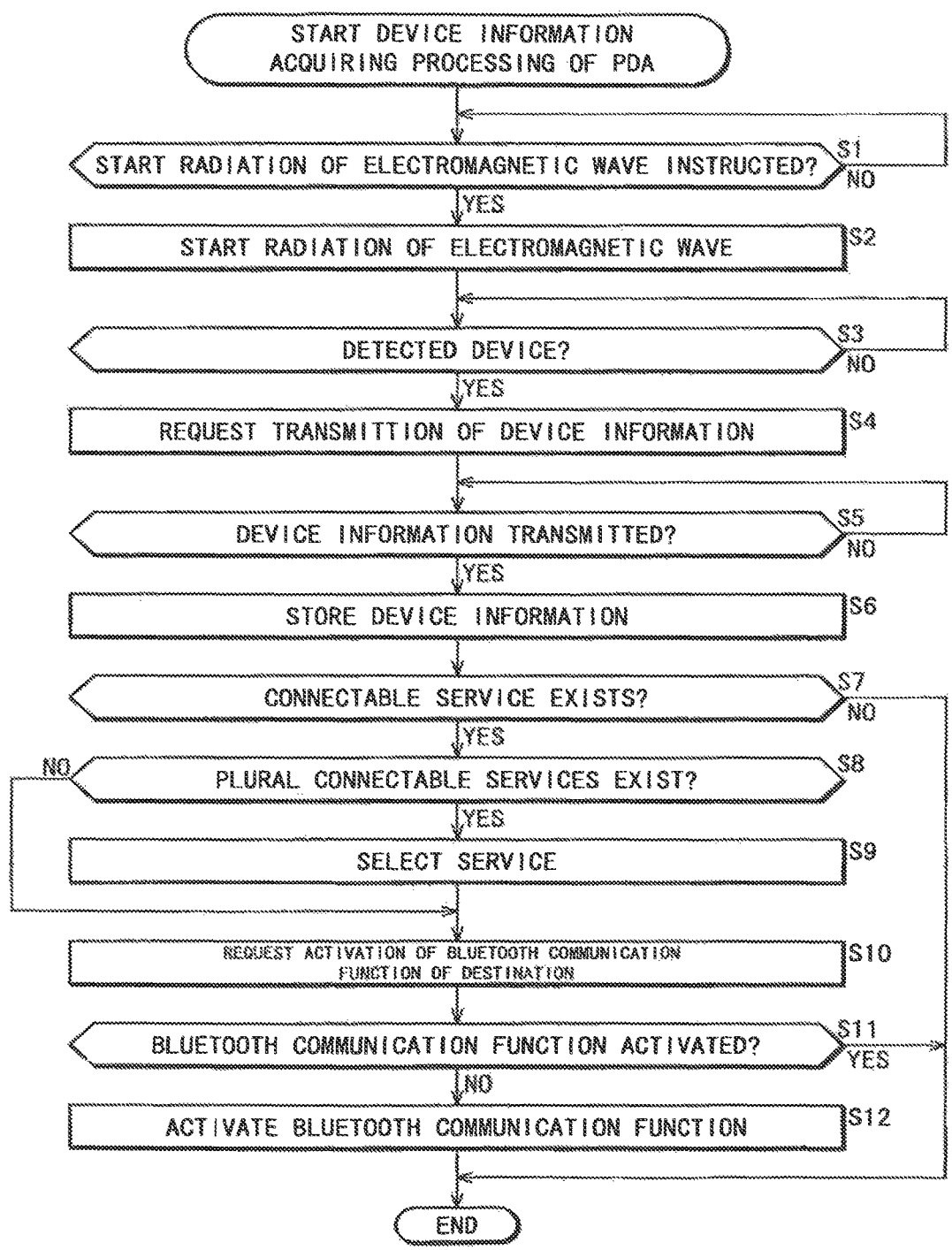
FIG. 8 is a flow chart explaining processing of the PDA of FIG. 1.

Now, the description goes back to FIG. 8. The CPU 101 which stored the device information provided from the personal computer 1 in the RAM 103 confirms the device information, and in step S7, determines whether or not a service connectable by the Bluetooth module 109 exists. In other words, the CPU 101 matches the service record of the device information as shown in FIG. 9 and the service which providable by the CPU 101, so that it determines whether or not the connectable service exists.

In step S7, in a case where it is determined that there is no connectable service between the CPU 101 and the personal computer 1, the CPU 101 terminates the processing. In addition, in a case where the device information including the above-described information and the connectable number is 0 or the current time is beyond the connection effective time, the processing subsequent thereto is terminated. As described above, in the PDA 2, devices to be connected thereto is limited depending on the device information notified of. Therefore, it is possible to inhibit establishment of communication with an unintended device so that higher quality wireless communication environment can be realized.

On the other hand, when the CPU 101 determines that the connectable service exists in step S7, the process goes to step S8.

For example, in a case where the PDA 2 desires to carry out communication through a serial communication service whose name is "Feel", and the service record notified from the personal computer 1 indicates "Service Class ID List: 0x1101 (serial communication service)" and "Service Name: Feel", the CPU 101 determines that a connectable service exists.

In step S8, the CPU 101 determines whether there are a plurality of connectable services between the PDA 2 and the personal computer 1. When the CPU 101 determines that there are a plurality of connectable services in step S8, the process goes to step S9 to select a service to connect. In other words, when the service record as described above is notified, the CPU 101 selects a serial communication service whose name is "Service Name: Feel" as a service for connection.

In addition, in a case where priority is set to the services providable by the Bluetooth module 109, the CPU 101 may select a service to which a highest priority is set among the plurality of services provided by the personal computer 1 in accordance with the notified service record. For example, in a case where the personal computer 1 provides a serial communication service and a file transfer service, and a highest priority is set to the serial communication service among the plurality of services providable by the Bluetooth module 109, the CPU 101 selects the serial communication service as a service to use.

In addition, the CPU 101 refers to a history of services used in the Bluetooth module 109, and if communication with the personal computer 1 through Bluetooth has been carried out in the past, the service most used or the service used latest between the PDA 2 and the personal computer 1 may be selected from the services provided by the personal computer 1. Of course, it may be arranged so that the services provided by the personal computer 1 are presented to the user and the user selects one therefrom. In addition, it may also be arranged so that the pass key is set at random to be notified of the PDA 2.

On the other hand, in a case where it is determined that there are not a plurality of connectable services (there is only one) in step S8, the CPU 101 sets the service as a service to use, and the process goes to step S10.

In step S10, the CPU 101 controls the reader/writer 108, and requests the personal computer 1 to start up a Bluetooth communication function. Since the request is notified of the personal computer 1 through the reader/writer 19, the Bluetooth module 20 and a program to control it is activated.

In step S11, the CPU 101 determines whether or not the Bluetooth communication function of the PDA 2, namely, the Bluetooth module 109 and a program controlling it are activated, and if yes, the CPU 101 terminates the processing and, on the other hand, if no, the process goes to step S12. In step S12, the CPU 101 supplies power to the Bluetooth module 109 and activates it, and, for example, develops a control program stored in the ROM 102 onto the RAM 103. Thereafter, the processing for acquiring the device information is finished, and a processing for establishing communication through Bluetooth, as described below, is carried out in accordance with the device information.

In this way, since the Bluetooth communication function is activated at a timing of receiving/transmitting the device information, power consumption can be kept down.

Figure 10:
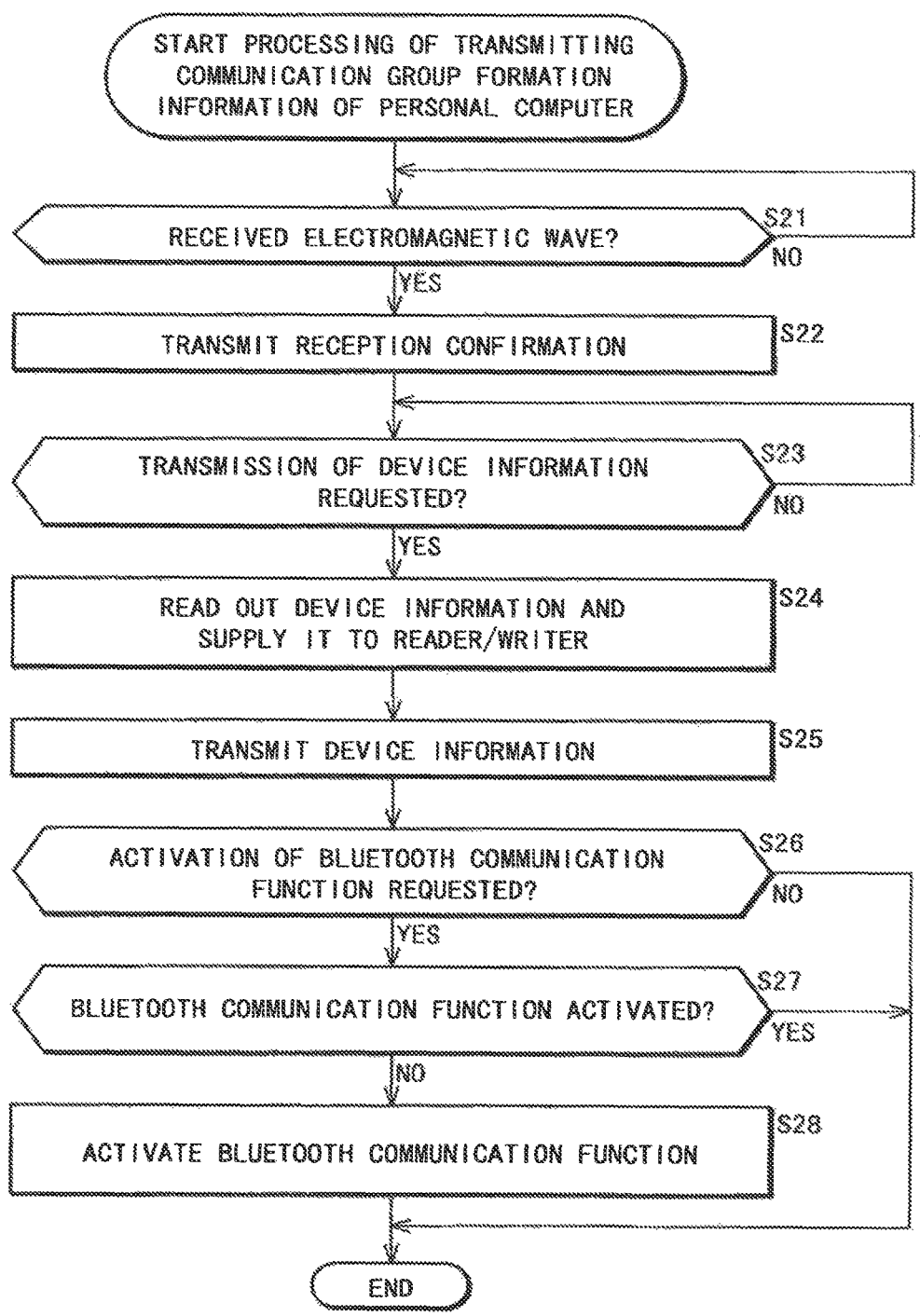
FIG. 10 is a flow chart explaining processing of the personal computer of FIG. 1.

Next, with reference to a flowchart of FIG. 10, the processing of the personal computer 1 for providing the device information in correspondence with the processing of the PDA 2 shown in FIG. 8 will be described.

In step S21, the CPU 11 of the personal computer 1 determines whether or not an electromagnetic wave radiated from the PDA 2 is received, on the basis of an output from the reader/writer 19, and waits until it is determined yes. And, it is determined yes, the process goes to step S22 and the CPU 11 controls the reader/writer 19 and transmits information confirming the reception of the electromagnetic wave to the PDA 2.

And, in step S23, the CPU 11 determines whether or not transmission of the device information is requested by the PDA 2 in accordance with an output from the reader/writer 19, and waits until it is determined yes. When it is determined that the transmission of the device information is requested in step S23, the process goes to step S24, and the CPU 11 reads out the device information as shown in FIG. 9, stored in the memory unit 18, for example, and provides it to the reader/writer 19. Incidentally, these device information may be stored in the RAM 63 of the reader/writer 19. In addition, the dynamically varying information such as the service data base may be updated at the timing.

The CPU 11 controls the reader/writer 19 to transmit the device information to the PDA 2 in step S25.

In step S26, the CPU 11 determines whether or not activation of the Bluetooth communication function is requested in accordance with an output from the reader/writer 19, and if no, terminates the processing. As described above, the PDA 2 which received the device information requests activation of the Bluetooth communication function.

When the CPU 11 determines that the activation of the Bluetooth communication function is requested in step S26, the process goes to step S27, and the CPU 11 determines whether or not the Bluetooth communication function is activated, that is, whether or not the Bluetooth module 20 and a program for controlling it are activated. When the CPU 101 determines that the Bluetooth communication function has been already activated, it terminates the processing. When the CPU 101 determines that the function is not activated, the process goes to step S28, and the CPU 101 supplies power to the Bluetooth module 20 and develops the program for controlling the Bluetooth module onto the RAM 13.

Figure 11:
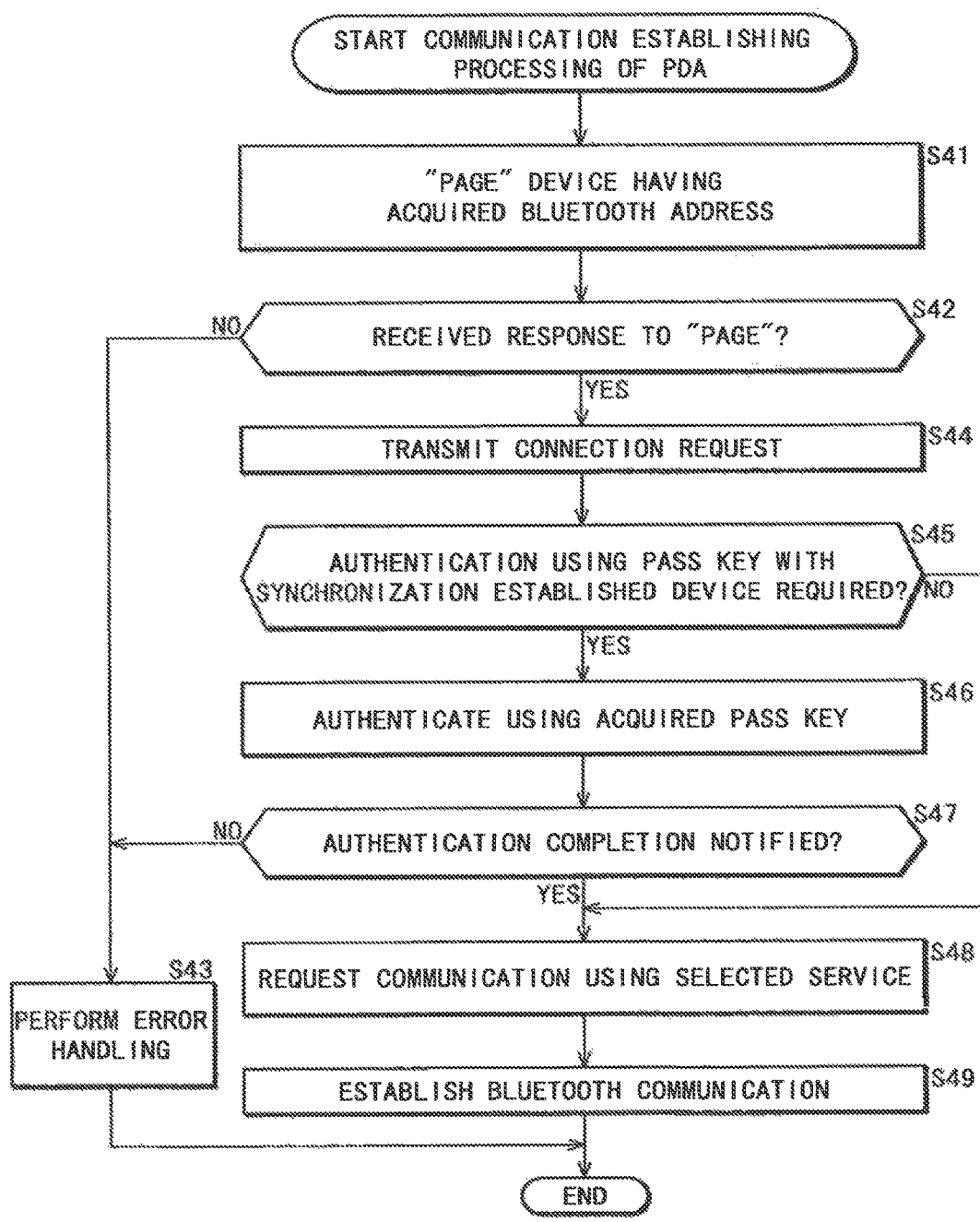
FIG. 11 is a flow chart explaining another processing of the PDA of FIG. 1.

Next, with reference to a flowchart of FIG. 11, the processing of the PDA 2 establishing the communication through Bluetooth in accordance with the device information after receiving the device information will be described. In other words, the processing shown in FIG. 11 is the one subsequent to that shown in FIG. 8.

In step S41, the CPU (CPU 81B) of the Bluetooth module 109 requests a device having the acquired Bluetooth address executing "Page", in accordance with an instruction from the CPU 101. In other words, the device information acquired from the personal computer 1 in accordance with the processing of FIG. 8 is already provided to the Bluetooth module 109 when the Bluetooth module 109 is activated. In addition, the "Page" is a processing for transmitting/receiving requests for starting Bluetooth communication and various information for establishing synchronization by designating a specified Bluetooth device.

In specific, attribute information (FHS packet) of the personal computer 1 and the PDA 2 are exchanged between them, and synchronization of the frequency axis and synchronization of the time axis are established in accordance with the exchanged attribute information. For example, the attribute information of the PDA 2 includes information regarding the Bluetooth address and the Bluetooth clock of the Bluetooth module 109.

Therefore, it may be arranged so that the page request transmitted in step S41 includes the attribute information of the PDA 2, and the personal computer 1 receiving the request establishes synchronization on the basis of the Bluetooth address of the PDA 2.

In step S42, the CPU 81B determines whether or not a response to the "Page" transmitted from the Bluetooth module 20 of the personal computer 1 is received, and if no, the process goes to step S43 and the CPU 81B terminates the processing after executing error handling. On the other hand, when the CPU 81B determines that the response to the request of the "Page" from the Bluetooth module 20 of the personal computer 1 is received, the process goes to step S44 and the CPU 81B requests the personal computer 1 for connection.

And the CPU 81B determines whether or not authentication using the pass key is required between the PDA 2 and the device with which the synchronization is established in response to the "Page", that is, the personal computer 1, and, if it is determined yes, the process goes to step S46.

In step S46, the CPU 81B carries out authentication using the pass key contained in the device information. The pass key is the one notified from the personal computer 1, and authentication processing is carried out also in the personal computer 1 using the same pass key.

And since, when the authentication is completed by the personal computer 1, the completion is notified, the CPU 81B determines whether or not the completion of the authentication is notified of in step S47. When the CPU 81B determines that the completion of the authentication is not notified of yet, the process goes to step S43, and the CPU 81B terminates the processing after executing the error handling. On the other hand, when the CPU 81B determines that the completion of the authentication is notified of, the process goes to step S48.

Incidentally, in step S45, if it is determined that the authentication using the pass key is not required, the processing of step S46 and step S47 are skipped and the processing of step S48 is carried out. There are some cases where the authentication using the pass key is not required depending on the setting of the device.

In step S48, the CPU 81B requests the personal computer 1 for connection through the selected service. For example, as described above, in a case where the serial communication service is selected as the connecting service in step S9 of FIG. 8, the CPU 81B acquires the server channel number (for example, Server Channel Number: 1) in the RFCOMM layer of the personal computer 1 utilizing the SDP, and requests connection according to the acquired server channel number. In addition, in a case where the selected service does not include dynamically varying attribute such as the server channel number, that is, the selected service is a service such as PAN (Personal Area Network), the CPU 81B may request connection in accordance with the information acquired through the device information without utilizing the SDP.

Then, in step S49, Bluetooth communication is established.

Figure 12:
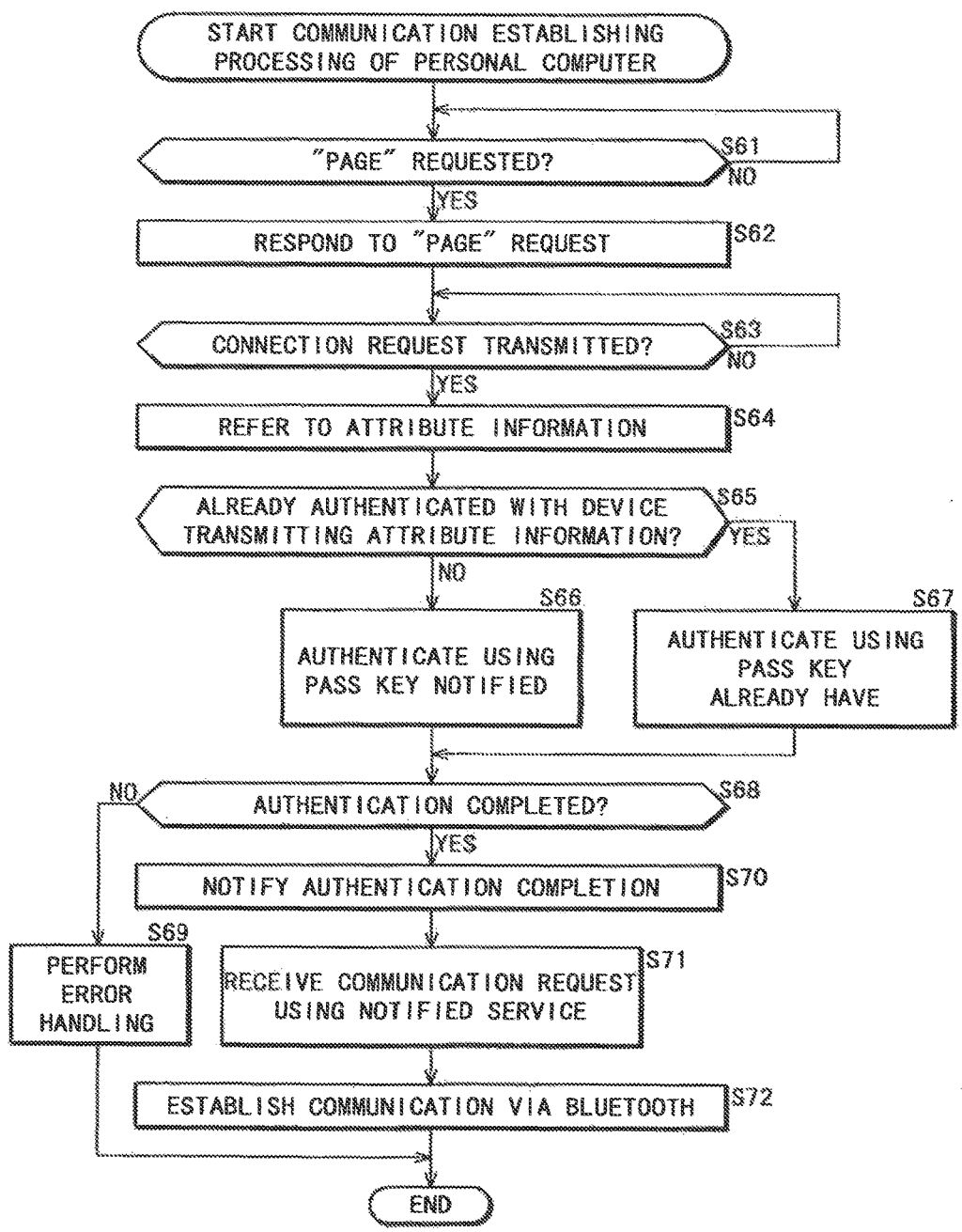
FIG. 12 is a flow chart explaining another processing of the personal computer of FIG. 1.

Next, with reference to a flowchart of FIG. 12, the processing of the personal computer 1 establishing the communication via Bluetooth after providing the device information will be explained. In other words, the processing shown in FIG. 12 is the one subsequent to that shown in FIG. 10.

In step S61, the CPU 81A of the Bluetooth module 20 determines whether or not a "Page" is requested by the PDA 2, and waits until it is determined yes. When the CPU 81A determines that the "Page" is requested in step S61, the process goes to step S62, and the CPU 81A transmits its attribute information to the PDA 2 so as to respond to the request of the "Page", and establishes synchronization with the PDA 2.

In specific, the CPU 81A establishes the synchronization of the frequency axis by calculating the frequency hopping pattern on the basis of the Bluetooth address of the PDA 2, and establishes the synchronization of the time axis by adding offset to the Bluetooth clock which the CPU 81A itself manages.

The CPU 81A determines whether or not the connection request is transmitted from the PDA 2 in step S63, and waits until it is determined yes. In a case where the CPU 81A determines that the connection request is transmitted from the PDA 2 in step S63, the process goes to step S64, and the CPU 81A refers to the attribute information transmitted together with the request of the page, for example, and confirms the Bluetooth address contained in the attribute information.

In step S65, the CPU 81A confirms existence of the link key on the basis of the confirmed Bluetooth address, and determines whether or not the authentication using the pass key has been carried out between the personal computer 1 and the device which transmitted the attribute information, that is, the PDA 2. When the authentication using the pass key is carried out, a link key generated in accordance with the pass key is stored during the authentication processing in correspondence with the Bluetooth address of the destination device of the authentication.

In a case where the CPU 81A determines that the authentication is not carried out with the PDA 2 (first communication with the PDA 2) in step S65, the process goes to step S66, and the CPU 81A carries out an authentication processing using a pass key identical to the pass key which is notified of the PDA 2 as the device information.

Then, the CPU 81A determines whether or not the authentication is completed in step S68, and in a case where it is determined that authentication is unsuccessful, the CPU 81A carries out error handling in step S69 and terminates the processing.

In addition, in a case where the CPU 81A determines that the authentication is successful, the process goes to step S70 and the CPU 81A notifies the PDA 2 of the completion of the authentication.

Incidentally, in a case where the CPU 81A determines that the authentication has been already carried out with the PDA 2 using the pass key and the personal computer 1 and the PDA 2 share a link key in step S65, the process goes to step S67, and the CPU 81A reads out the link key from a flash memory (a flash memory of the Bluetooth module 20) and carries out an authentication processing using the link key to execute determination processing or the like thereafter.

When the CPU 81A receives the request of Bluetooth communication through the service selected by the PDA 2 in step S71, the process goes to step S72, and the CPU 81A activates the service to establish the communication.

According to the above-described processing, since the PDA 2 acquires the Bluetooth address of the personal computer 1 as the device information in advance in the process of FIG. 8, it is possible for the personal computer 1 to make a "Page" directly without making an "Inquiry" to request communication. In other words, in a case where the PDA 2 has not acquired the Bluetooth address, the PDA 2 is required to detect devices existing around it and make an "Inquiry" so as to receive a notice including the Bluetooth address or the like from the devices.

Therefore, even in a case where there are a plurality of Bluetooth devices around the PDA 2, the PDA 2 can make the "Page" without receiving the notice of information regarding the Bluetooth device other than the personal computer 1 and the time required for establishing the synchronization can be reduced.

In addition, since the pass key required between devices having communication for the first time is notified of the PDA 2 as the device information, and the authentication processing is carried out by the personal computer 1 and the PDA 2 using the same pass key, the user of the PDA 2 can skip an operation of inputting the pass key to the both devices even in a case of first communication between the PDA 2 and the personal computer 1.

Furthermore, information regarding the providable services is notified of the PDA 2 in a state that it is included in the device information and is selected on the basis of the priority or the like, the user of the PDA 2 can skip an operation of selecting the service.

Therefore, the user of the PDA 2 can make communication through Bluetooth easily and promptly started by making the PDA 2 closer to the personal computer 1.

In the above description, it is arranged that an electromagnetic wave is radiated from the reader/writer 108 of the PDA 2 and the device information is provided from the reader/writer 19 of the personal computer 1 which received the electromagnetic wave. However, on the contrary, it may also be arranged that an electromagnetic wave is emitted from the reader/writer 19 of the personal computer 1 and the device information of the PDA 2 is provided to the personal computer 1 from the reader/writer 108 of the PDA 2 which received the electromagnetic wave. In this case, the personal computer 1 which acquired the device information of the PDA 2 makes a "page" or the like in accordance with the Bluetooth address of the PDA 2 included in the device information so as to establish the Bluetooth communication with the PDA 2.

Figure 13:
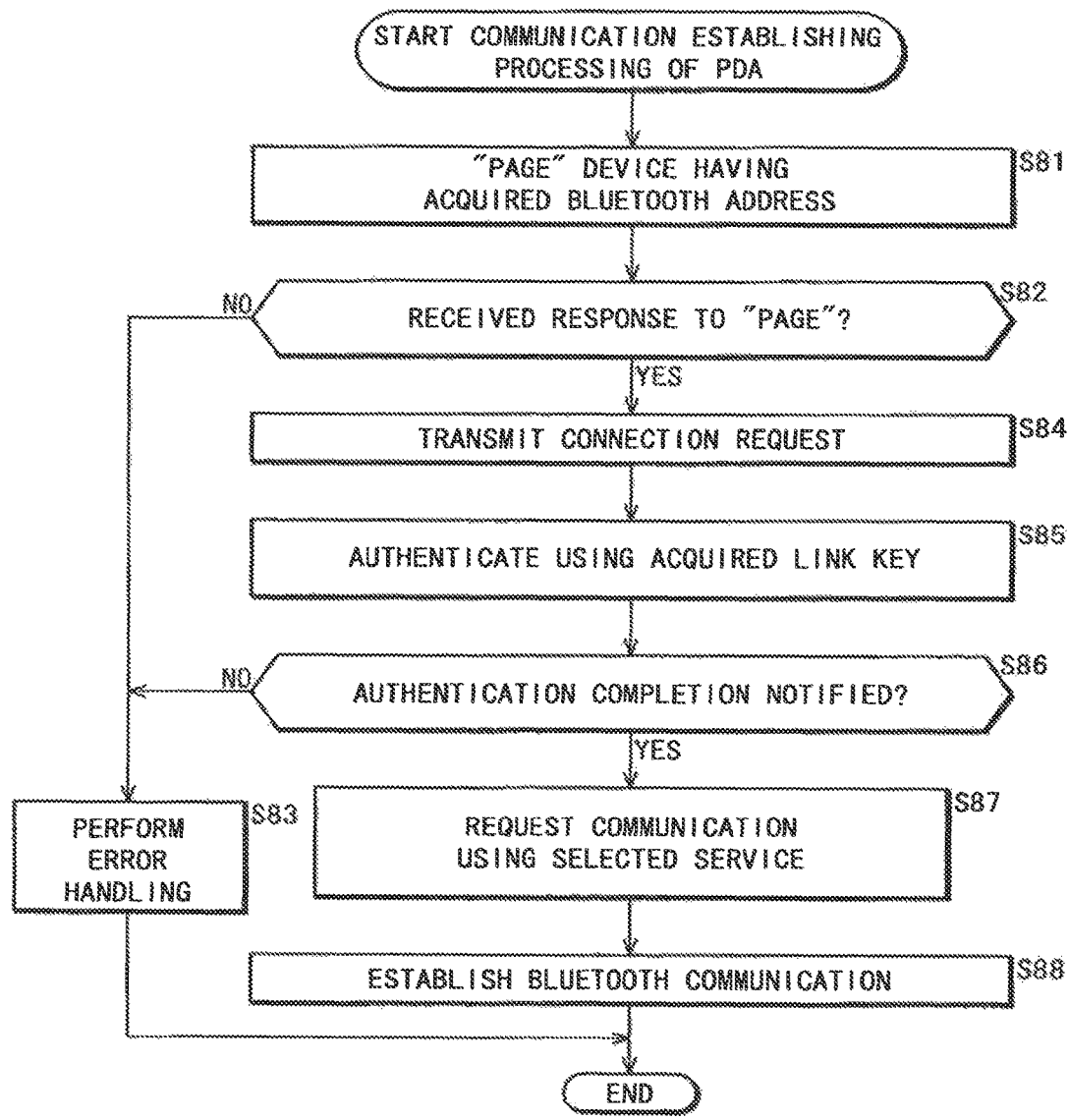
FIG. 13 is a flow chart explaining still another processing of the PDA of FIG. 1.

Next, with reference to a flowchart of FIG. 13, another processing of the PDA 2 establishing the communication through Bluetooth in accordance with the device information after receiving the device information.

Processing shown in FIG. 13 is processing basically similar to the processing shown in FIG. 11 and is different in utilizing a link key, not the pass key notified as the device information, in the authentication processing.

In other words, the CPU 81B of the Bluetooth module 109 makes a "Page" between the PDA 2 and the personal computer 1, after having established synchronization, it carries out the authentication processing using the link key notified as the device information, in step S85.

Then, the authentication is completed by the personal computer 1, and when it is notified, the CPU 81B notifies the personal computer 1 of the service to utilize to establish the communication via Bluetooth.

Figure 14:
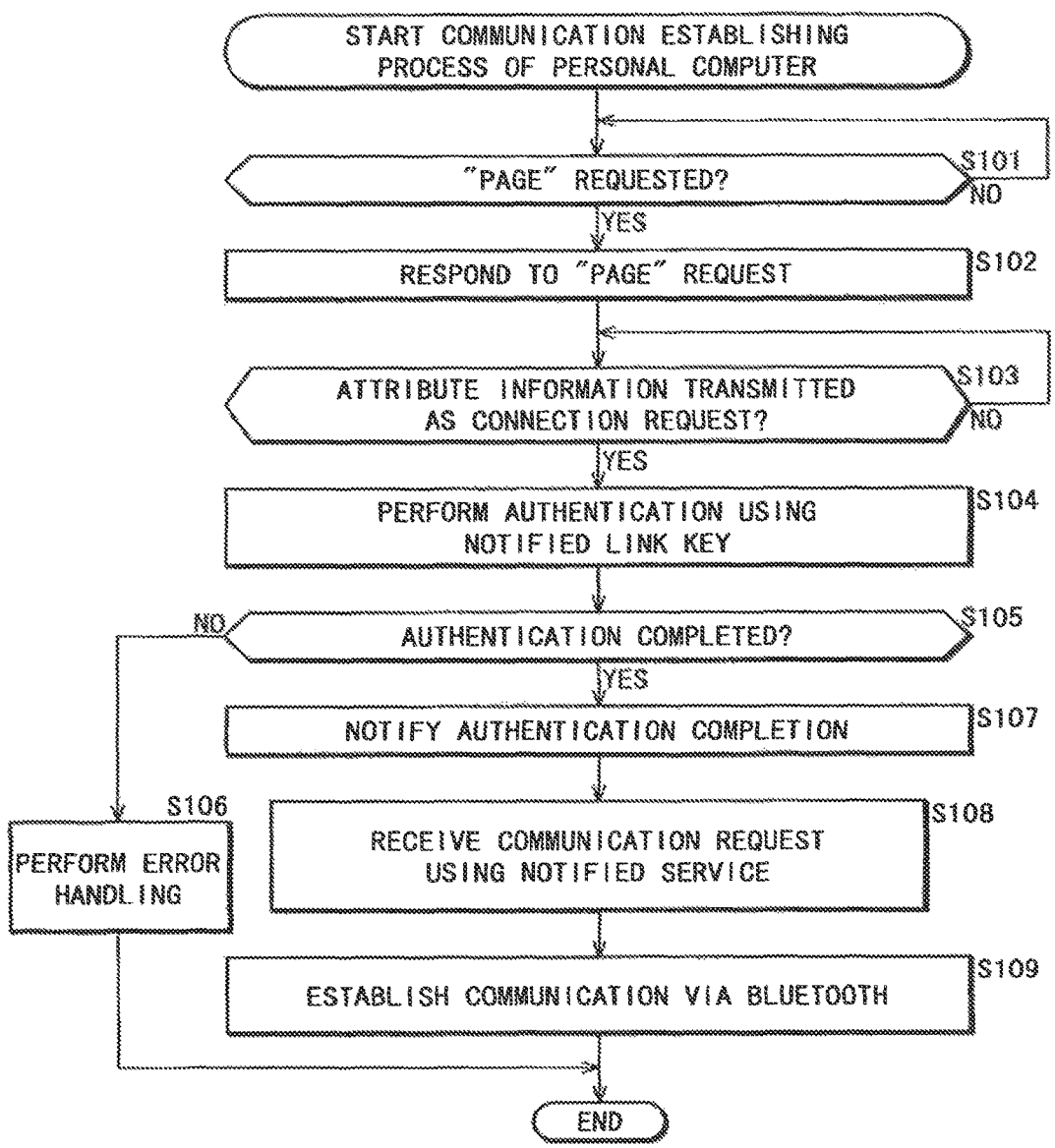
FIG. 14 is a flow chart explaining still another processing of the personal computer of FIG. 1.

FIG. 14 is a flowchart explaining another processing of the personal computer 1 for establishing communication via Bluetooth after providing the device information.

Processing shown in FIG. 14 is processing basically similar to the processing shown in FIG. 12 and is different in utilizing a link key, not the pass key notified as the device information, in the authentication processing.

In other words, the CPU 81A of the Bluetooth module 20 makes a "Page" between the personal computer 1 and the PDA 2 in step S102, and after having established synchronization, it carries out the authentication processing using a link key identical to the link key notified as the device information.

And when the authentication is completed, in step S107, the CPU 81A notifies the PDA 2 of the completion of the authentication, and when receiving the notice of the service to utilize, it establishes the communication via Bluetooth in step S108.

As described above, the authentication can be also carried out using the link key notified as the device information. Therefore, the user of the personal computer 1 or the PDA 2 can start communication via Bluetooth easily and promptly by making the device close to the other.

Figure 15:
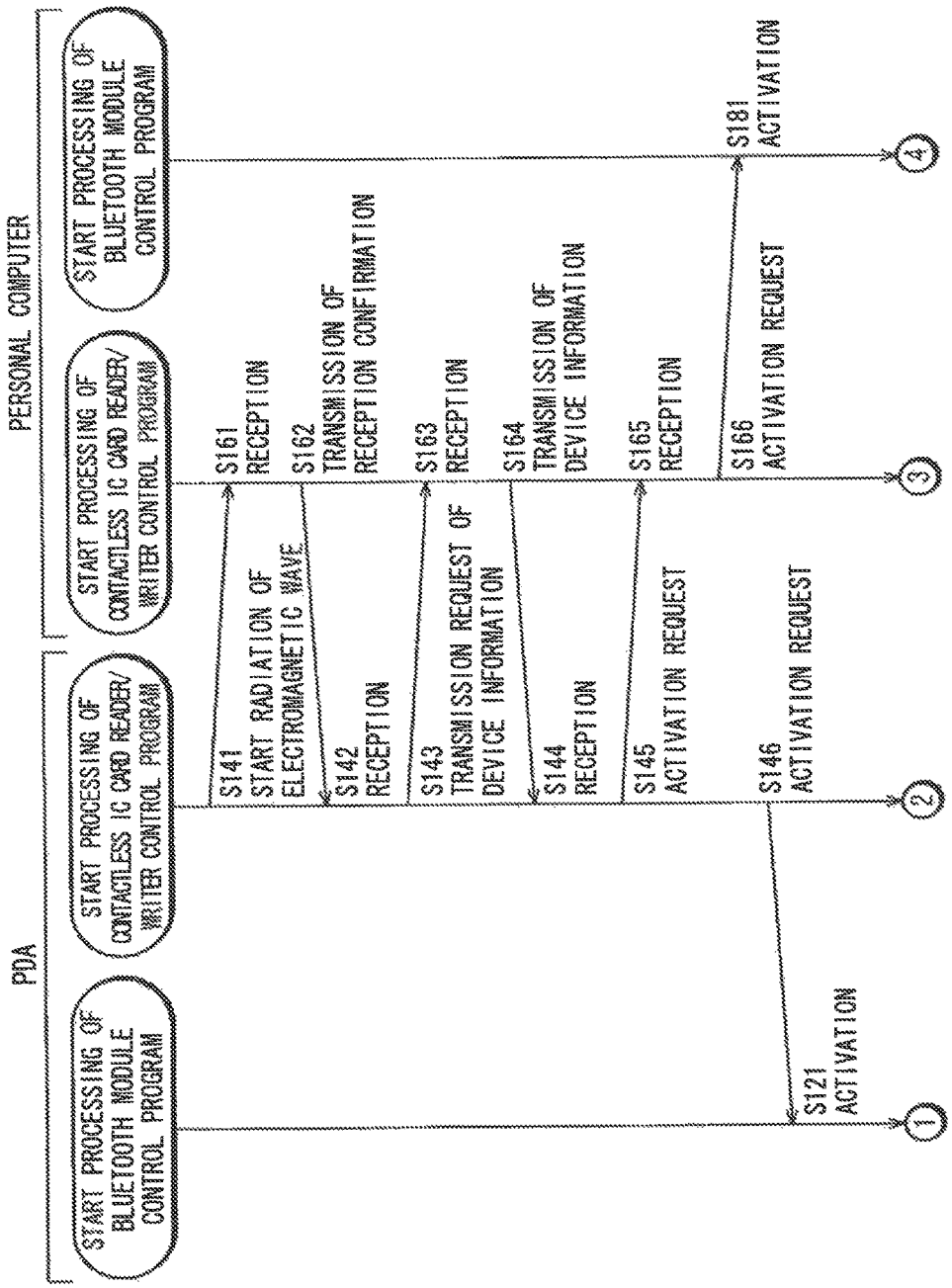
FIG. 15 is a flow chart explaining processing of the communication system of FIG. 1.
Figure 16:
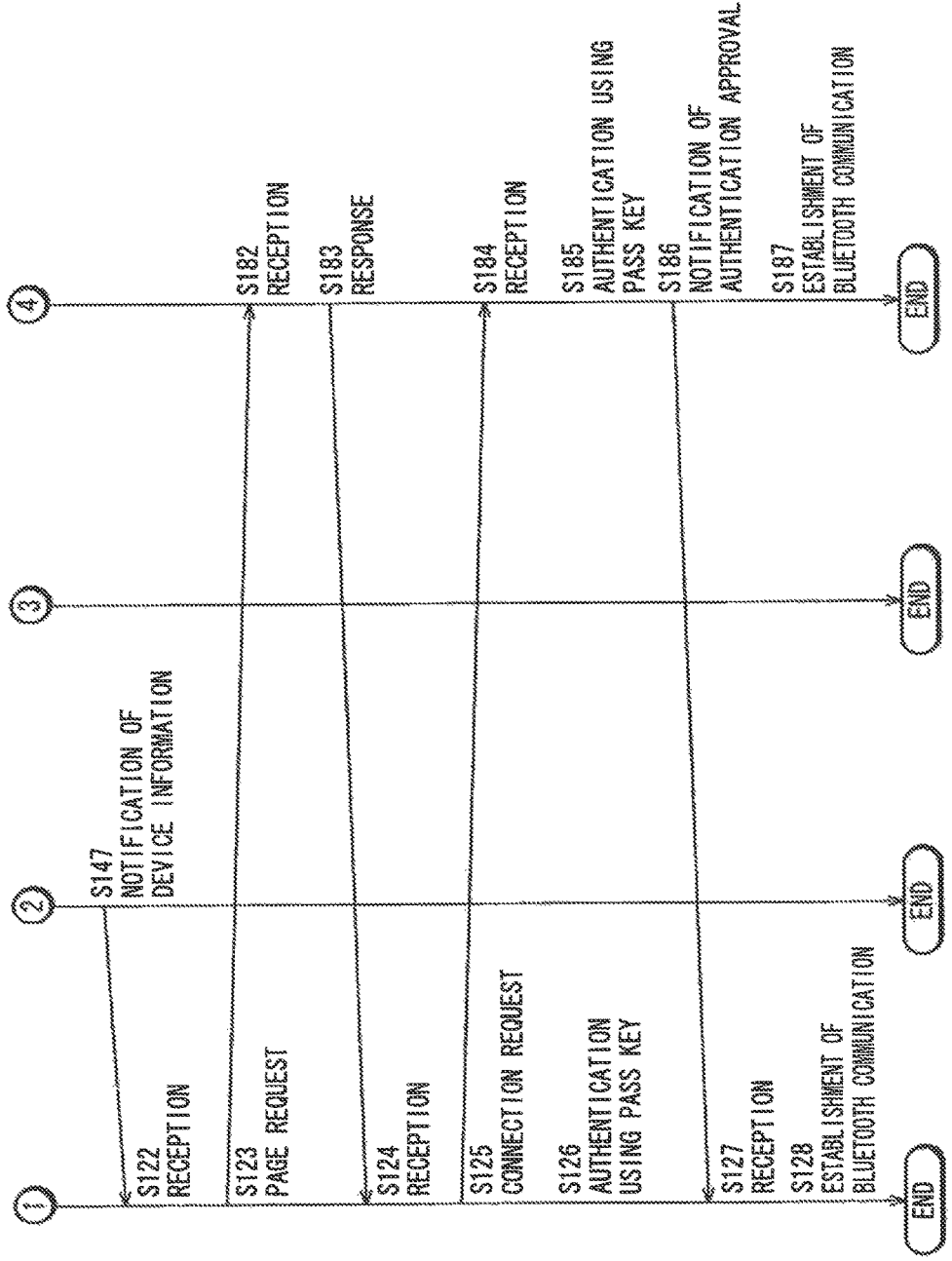
FIG. 16 is a flow chart explaining processing of the communication system of FIG. 1, which shows subsequent steps of those shown in FIG. 15.

Next, with reference to flowcharts of FIG. 15 and FIG. 16, a series of processing for establishing communication between the personal computer 1 and the PDA 2 will be explained. In other words, processing shown in FIG. 15 and FIG. 16 are basically similar to those explained with reference to FIG. 8 and FIGS. 10 to 12.

In step S141, a control program controlling the reader/writer 108 of the PDA 2 (hereinafter, referred to as "reader/writer control program 108A" accordingly) starts radiation of an electromagnetic wave to detect the reader/writer 19 of the personal computer 1.

And, in step S161, a control program controlling the reader/writer 19 of the personal computer 1 which received the electromagnetic wave (hereinafter, referred to as "reader/writer control program 19A") transmits reception confirmation to notify of reception of the electromagnetic wave in step S162.

The reader/writer control program 108A of the PDA 2 which received the reception confirmation in step S142 transmits a transmission request of the device information to reader/writer 19 in step S143.

In step S163, the reader/writer control program 19A of the personal computer 1 which received the transmission request of the device information transmits the device information as shown in FIG. 9 in step S164.

In step S144, the reader/writer control program 108A of the PDA 2 receives the device information, and requests activation of a Bluetooth communication function to the personal computer 1 in step S145.

And, in step S165, the personal computer 1 receives the request for activation at the reader/writer control program 19A, and a control program for controlling the Bluetooth module 20 (hereinafter, referred to as "Bluetooth module control program 20A, accordingly) is activated in step S166.

On the other hand, in step S146, the PDA 2 transmits an activation request to a control program controlling the Bluetooth module 109 (hereinafter, referred to as "Bluetooth module control program 109A, accordingly). In response thereto, the Bluetooth module control program 109A is activated in step S121.

The reader/writer control program 108A which acquired the device information of the personal computer 1 notifies the Bluetooth module control program 109A of the device information in step S147.

The Bluetooth module control program 109A receives the device information notified of from the reader/writer control program 108A in step S122, and, in accordance with the device information, requests the Bluetooth module control program 20A of the personal computer 1 to execute a "Page" in step S123.

When the Bluetooth module control program 20A of the personal computer 1 receives a request of an "Inquiry" in step S182, it responds thereto in step S183.

Then, in step S124, the response is received by the Bluetooth module control program 109A of the PDA 2 and synchronization is established between the personal computer 1 and the PDA 2. In specific, in steps S123 and S124, and in steps S182 and S183, attribute information or the like is exchanged and synchronization of the frequency axis and synchronization of the time axis are established.

In step S125, a connection request is transmitted from the Bluetooth module control program 109A of the PDA 2 to the Bluetooth module control program 20A of the personal computer 1. The connection request also includes information regarding the service selected in accordance with the device information.

The Bluetooth module control program 20A of the personal computer 1 receives the connection request including the information regarding the service in step S184, and carries out an authentication processing using a pass key identical to that which is notified of the PDA 2 as the device information in step S185.

In a similar way, in step S126, an authentication processing is carried out by the Bluetooth module control program 109A of the PDA 2.

When the authentication is completed using the pass key, the Bluetooth module control program 20A of the personal computer 1 notifies the PDA 2 of the completion of the authentication, in step S186, to establish communication via Bluetooth.

On the other hand, when receiving the notice of the completion of the authentication, in step S127, the Bluetooth control program 109A of the PDA 2 establishes communication with the personal computer 1 in step S128.

In the above description, the Bluetooth module control program 109A of the PDA 2 is set to be a master in Bluetooth communication, and the Bluetooth module control program 20A of the personal computer 1 is to be a slave. However, after establishing the synchronization, the role of each device can be switched accordingly.

Figure 18:
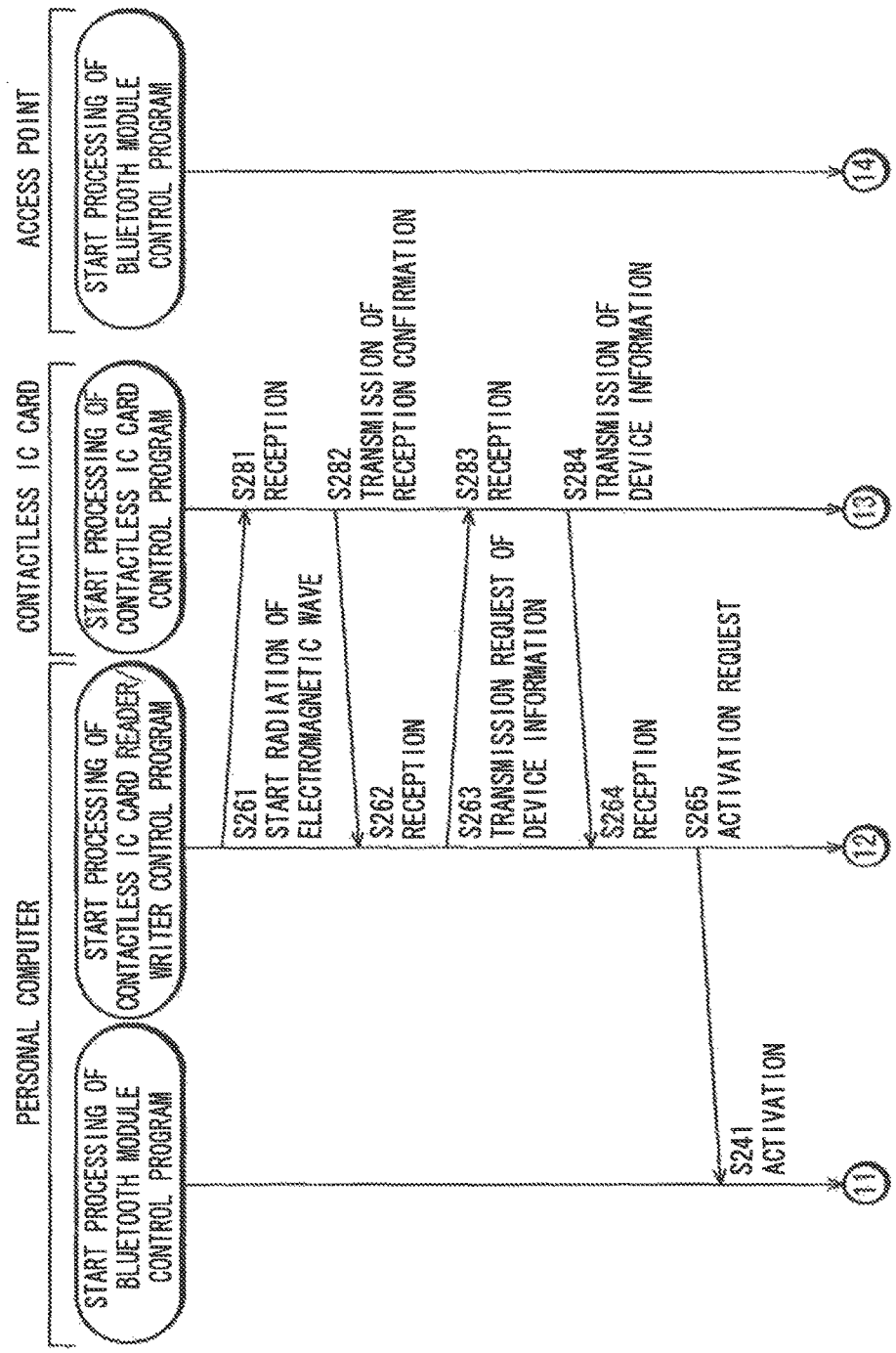
FIG. 18 is a flow chart explaining another processing of the communication system of FIG. 1.
Figure 19:
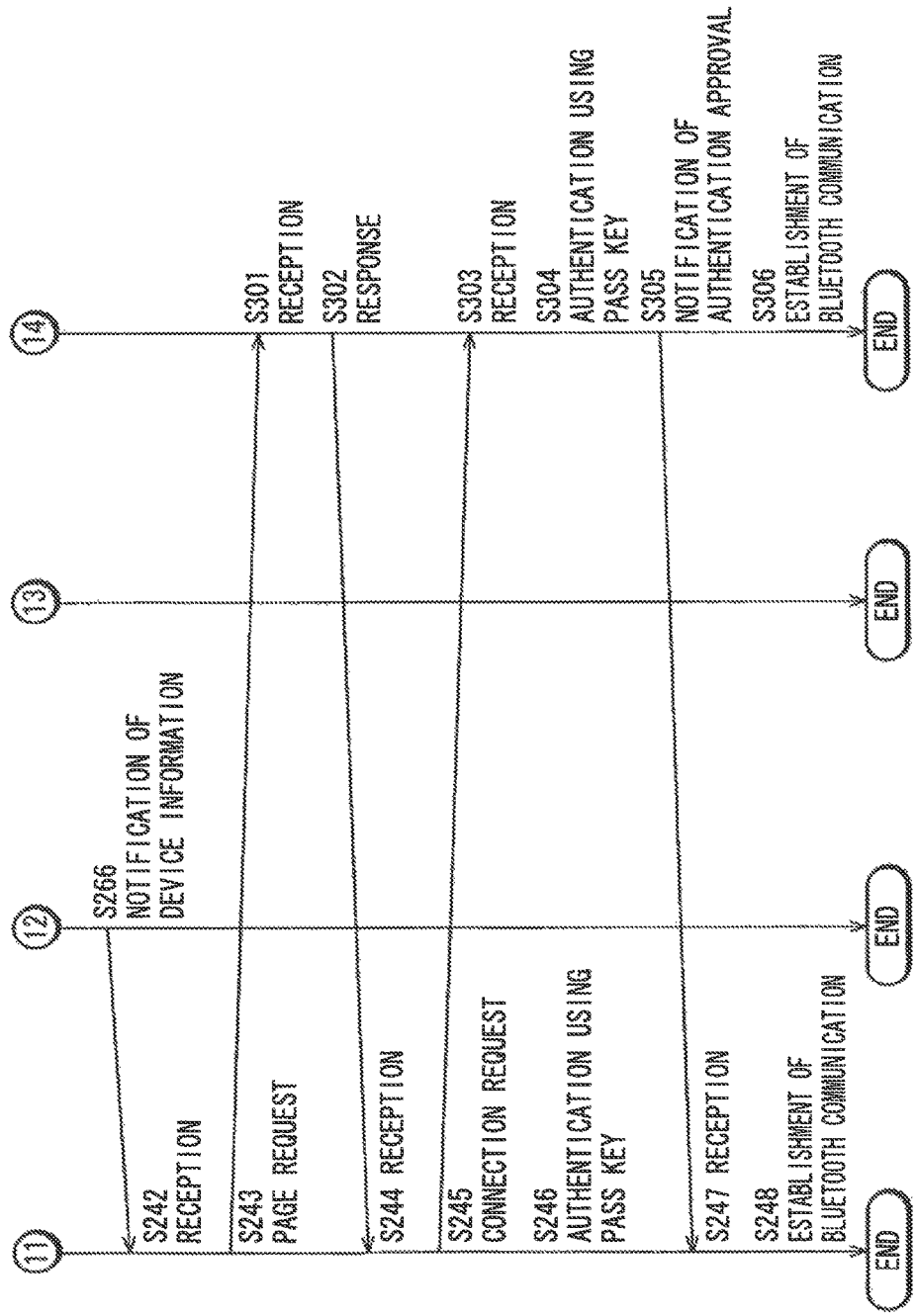
FIG. 19 is a flow chart explaining another processing of the communication system of FIG. 1, which shows subsequent steps of those shown in FIG. 18.

Next, with reference to flowcharts of FIGS. 17 to 19, processing for establishing communication via Bluetooth between designated devices in accordance with device information notified of from the contactless IC card 3 will be described. In this example, a series of processing for establishing communication via Bluetooth between the personal computer 1 and the access point 4 by making the contactless IC card 3 close to the personal computer 1, in accordance with the device information notified of from the contactless IC card 3.

Figure 17:
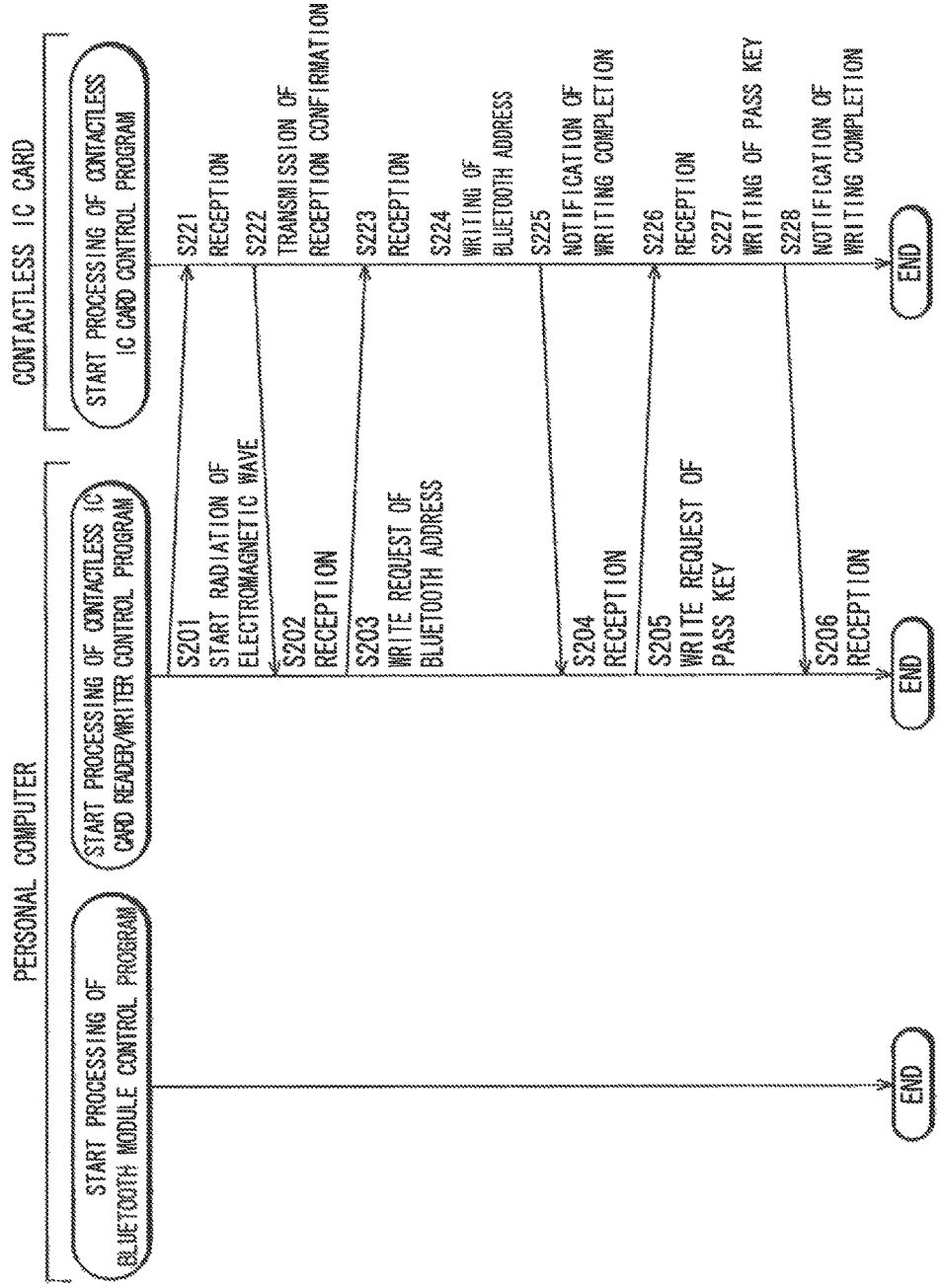
FIG. 17 is a flow chart explaining processing carried out between the personal computer of FIG. 1 and a contactless IC card.

First, with reference to the flowchart of FIG. 17, the processing of the personal computer 1 to write the device information onto the contactless IC card 3.

In other words, in order to start communication between the personal computer 1 and the access point 4 in accordance with the information read out from the contactless IC card 3, it is required for the user to operate the personal computer 1 or the like to store the device information of the access point 4 in the contactless IC card 3.

In step S201, the reader/writer control program 19A of the personal computer 1 starts radiation of an electromagnetic wave to detect the contactless IC card 3.

For example, when the contactless IC card 3 is made close to the personal computer 1 by the user, a control program controlling the contactless IC card 3 (hereinafter, referred to as "contactless IC card control program 3A, accordingly) receives the electromagnetic wave in step S221, and transmits a reception confirmation notifying the reception to the personal computer 1 in step S222.

The contactless IC card 3 is driven in accordance with the induced power generated by the electromagnetic wave received from the reader/writer 19 of the personal computer 1 or the like and transmits such a reception confirmation.

When the reader/writer control program 19A of the personal computer 1 receives the reception confirmation transmitted from the contactless IC card 3 in step S202, it requests the contactless IC card 3 to write the Bluetooth address in step S203. The Bluetooth address requested to be written is a Bluetooth address of the access point 4, and, for example, it is inputted by the user operating the key board 7.

The contactless IC card control program 3A which received the write request of the Bluetooth address in step S223 writes the Bluetooth address in the EEPROM 134 and makes it stored in step S224. Then, writing of the Bluetooth address which has been notified of is completed, the contactless IC card control program 3A notifies the personal computer 1 of the completion of the writing of the Bluetooth address in step S225.

When the completion of the writing of the Bluetooth address is notified of the reader/writer control program 19A of the personal computer 1 in step S204, the reader/writer control program 19A next requests the contactless IC card 3 to write a pass key in step S205. The pass key requested to be written here is also the one inputted upon operation of the key board 7 by the user, and is identical to the pass key already set in the access point 4.

When the contactless IC card control program 3A of the contactless IC card 3 receives the request from the reader/writer control program 19A of the personal computer 1 in step S226, the process goes to step S227, the program 3A writes the notified pass key in the EEPROM 134 similarly to the Bluetooth address and store it therein.

And when writing of the pass key is completed, the contactless IC card control program 3A notifies the personal computer 1 of the completion of writing in step S228, and terminates the processing.

On the other hand, when the reader/writer control program 19A of the personal computer 1 receives the notice regarding the completion of writing of the pass key from the contactless IC card control program 3A in step S206, it terminates the processing.

Repetition of the writing processing as described above stores the device information regarding the access point 4 which is similar to that shown in FIG. 9 in the EEPROM 134 of the contactless IC card 3. Therefore, it is possible to establish the communication via Bluetooth between the personal computer 1 and the access point 4 only by making the contactless IC card 3 in which the device information of the access point 4 is stored close to the personal computer 1.

In the above description, the personal computer 1 is operated to write the device information of the access point 4 on the contactless IC card 3. However, it may be arranged so that in a case where the access point 4 is provided with a reader/writer, the device information of the access point 4 is written on the contactless IC card 3 only by making the contactless IC card 3 closer to the reader/writer of the access point 4. Of course, it may also be arranged so that the reader/writer 108 of the PDA 2 is used for writing the device information on the contactless IC card 3.

Next, with reference to flowcharts of FIG. 18 and FIG. 19, a series of processing for establishing communication via Bluetooth between the personal computer 1 and the access point 4 by making the contactless IC card 3 in which the device information of the access point 4 is stored close to the personal computer 1 will be described.

Processing of the reader/writer control program 19A of the personal computer 1 in step S261 to step S265, and processing of the contactless IC card control program 3A of the contactless IC card 3 in step S281 to step S284 are basically similar to those of the reader/writer control program 108A in step S141 to step S146 and those of the reader/writer control program 19A in step S161 to step S165 in FIG. 15, respectively.

In other words, when the reader/writer control program 19A of the personal computer 1 detects the contactless IC card 3 using the radiated electromagnetic wave, it requests the contactless IC card 3 to transmit the device information stored therein in step S263. And when the reader/writer control program 19A receives the device information notified of from the contactless IC card 3, it activates the Bluetooth control program 20A in step S265 and notifies the Bluetooth module control program 20A of the device information in step S266.

On the other hand, when the contactless IC card control program 3A of the contactless IC card 3 receives the electromagnetic wave radiated from the personal computer 1, it transmits the device information of the access point 4 written in accordance with the processing of FIG. 17 to the personal computer 1 in step S284 and terminates the processing.

And when the Bluetooth module control program 20A of the personal computer 1 receives the device information of the access point 4 in step S242, the process goes to step S243 and the control program 20A requests the access point 4 to make a "Page" in accordance with the Bluetooth address included in the device information of the access point 4.

Thereafter, processing similar to those executed between the personal computer 1 and the PDA 2 described with reference to FIG. 16 are carried out between the personal computer 1 and the access point 4.

In other words, when a control program controlling the Bluetooth module 159 of the access point 4 (hereinafter, referred to as "Bluetooth module control program 159A", accordingly) receives the request of the "Page" in step S301, the process goes to step S302 and the control program 159A responds to the request to establish synchronization with the personal computer 1.

In step S245, the Bluetooth module control program 20A of the personal computer 1 transmits a connection request including information regarding the service selected in accordance with the service record included in the device information which is notified of from the contactless IC card 3 to the access point 4.

When the Bluetooth module control program 159A of the access point 4 receives the connection request transmitted from the personal computer 1 in step S303, the process goes to step S304 and the control program 159A carries out authentication using a pass key identical to the pass key stored in the contactless IC card 3. As described above, for example, the pass key stored in the RAM 153 of the access point 3 and the pass key described in the device information stored in the contactless IC card 3 are set to be the same by the user.

And when the authentication is completed, the Bluetooth module control program 159A notifies the personal computer 1 of the completion of the authentication in step S305, and then, in step S306, establishes the communication via Bluetooth.

The Bluetooth module control program 20A of the personal computer 1 receives the notice in step S247, and in step S248, establishes the communication via Bluetooth.

Thereafter, the user can connect to the network 5 with the personal computer 1 through the access point 4 and can use various contents introduced on the network 5. In other words, the user can connect the personal computer 1 to the network 5 only by making the contactless IC card 3 close to the personal computer 1.

In the above description, the communication between the personal computer 1 and the access point 4 is established utilizing the contactless IC card 3. However, it is also possible to establish communication between the PDA 2 and the access point 4 by making the contactless IC card 3 close to the PDA 2.

In accordance with the above processing, the communication with the access point 4 having no contactless IC card reader/writer function can be started easily and promptly. Furthermore, even in a case where the access point 4 is place on a ceiling in a building, for example, where it is difficult to get the PDA 2 or the like up, it is possible to easily start communication using the contactless IC card 3.

Figure 20:
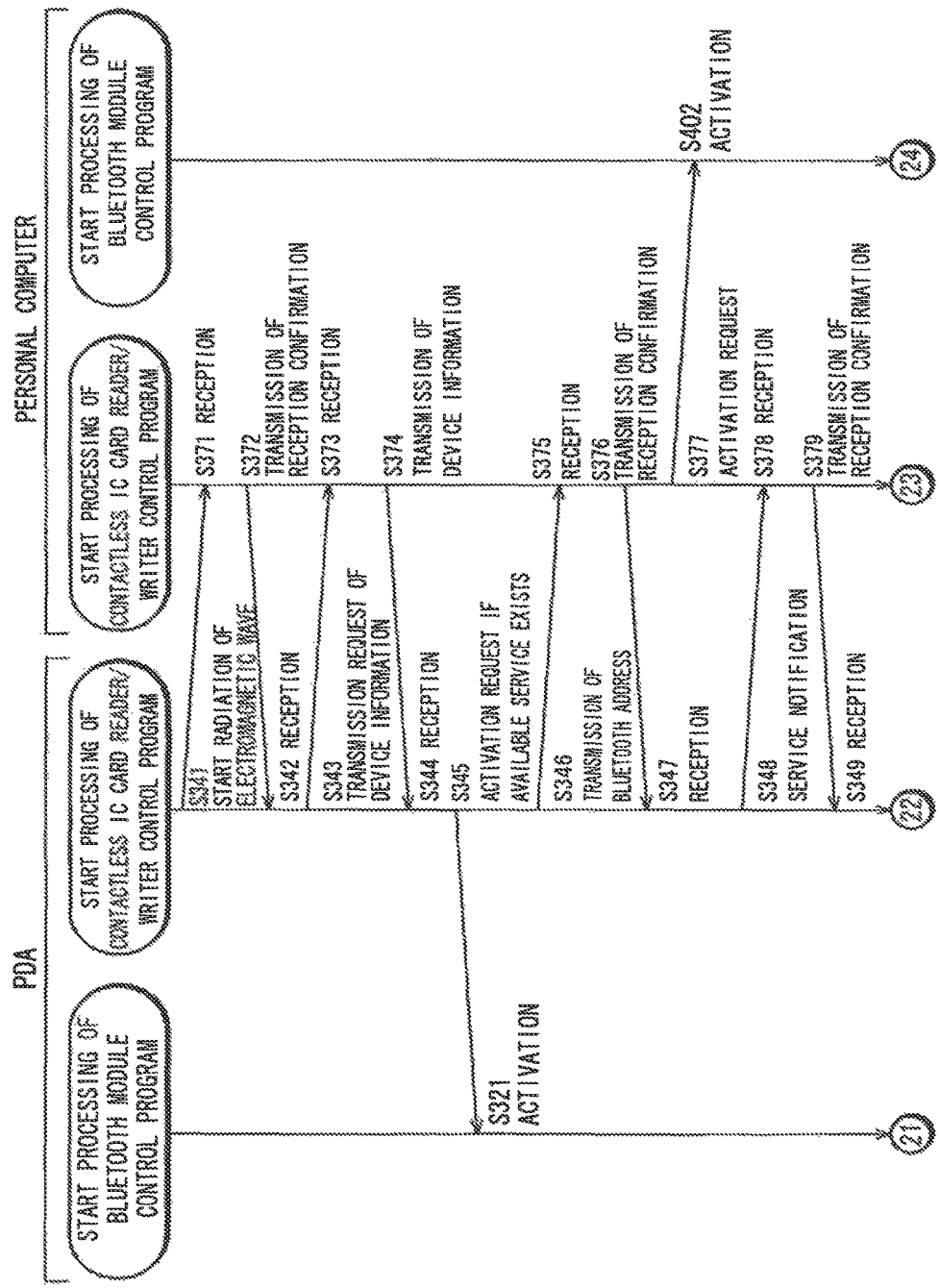
FIG. 20 is a flow chart explaining still another processing of the communication system of FIG. 1.
Figure 21:
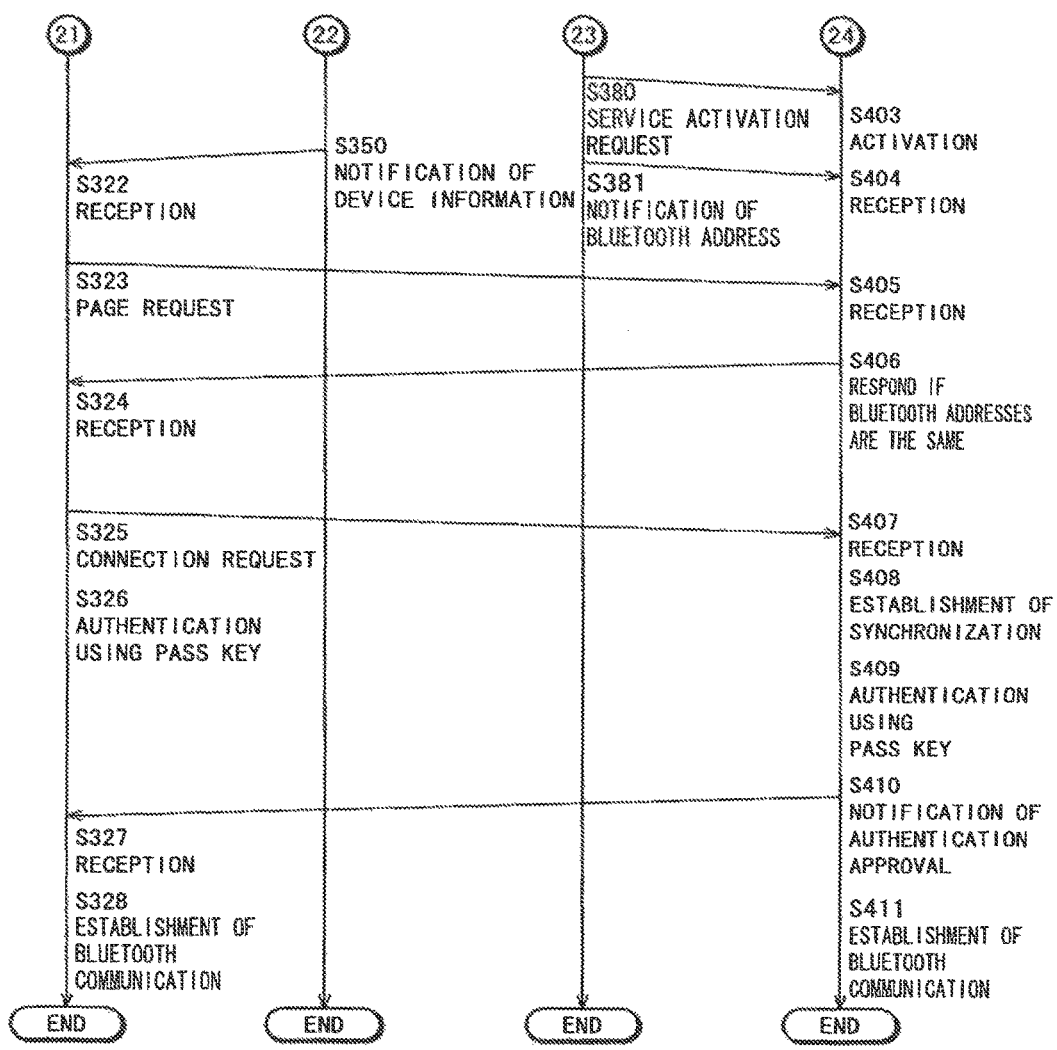
FIG. 21 is a flow chart explaining still another processing of the communication system of FIG. 1, which shows subsequent steps of those shown in FIG. 20.

Next, with reference to flowcharts of FIG. 20 and FIG. 21, another series of processing of the communication system in FIG. 1 for establishing communication between the personal computer 1 and the PDA 2.

Processing shown in FIG. 20 and FIG. 21 are basically similar to those shown in FIG. 15 and in FIG. 16, respectively. In other words, in step S341, the reader/writer control program 108A of the PDA 2 starts radiation of the electromagnetic wave to detect the reader/writer 19 of the personal computer 1, and when the personal computer 1 transmits a reception confirmation in response thereto, the control program 108A requests the reader/writer control program 19A to notify the device information in step S343.

And as described above, when a service or the like is selected and a service available between the PDA 2 and the personal computer 1 exists, the reader/writer control program 108A activates the Bluetooth module control program 109A in step S345.

On the other hand, when the electromagnetic wave radiated from the reader/writer 108 of the PDA 2 is received, the reader/writer control program 19A of the personal computer 1 provides the device information of the personal computer 1 to the PDA 2 in step S374.

In step S346, the reader/writer control program 108A of the PDA 2 notifies the personal computer 1 of the Bluetooth address of the Bluetooth module 109. The Bluetooth address notified here is used when it is determined to be the same as the Bluetooth address acquired at the time of "Page" or not. For example, in a case where the Bluetooth address acquired by the personal computer 1 at the time of the "Page" is not the same as the Bluetooth address notified of from the reader/writer 108 of the PDA 2, processing subsequent to the "Page" is not carried out and the processing is terminated.

When the Bluetooth address notified from the PDA 2 is received in step S375, the reader/writer control program 19A of the personal computer 1 transmits a reception confirmation to the PDA 2 in step S376. In addition, the reader/writer control program 19A activates the Bluetooth module control program 20A in step S377.

On the other hand, when the reception confirmation transmitted from the personal computer 1 is received in step S347, the process goes to step S348, and the reader/writer control program 108A of the PDA 2 notifies the personal computer 1 of the selected service. In addition, since the reception confirmation is transmitted from the personal computer 1, the reader/writer control program 108A receives it in step S349.

When the reader/writer control program 19A of the personal computer 1 receives the service notified from the PDA 2 in step S378, it transmits a reception confirmation in step S379, and notifies the Bluetooth module control program 20A of the notified service in step S380 to activate the service. In addition, the reader/writer control program 19A notifies the Bluetooth module control program 20A of the Bluetooth address notified from the PDA 2 in step S381.

The Bluetooth module control program 20A activates the service selected by the PDA 2 in step S403, and receives the Bluetooth address of the PDA 2 in step S404.

Thereafter, in step S323 to step S328, the Bluetooth module control program 109A of the PDA 2 carries out processing similar to those in steps from S123 to S128 shown in FIG. 16. In addition, in steps from S405 to S411, the Bluetooth module control program 20A of the personal computer 1 carries out processing basically similar to those in from step S182 to step S188 as shown in FIG. 16.

In other words, the "Page" is made between the Bluetooth module control program 109A of the PDA 2 and the Bluetooth module control program 20A of the personal computer 1. And, when the Bluetooth module control program 20A of the personal computer 1 acquires a Bluetooth address from PDA 2 during the "Page", it compares the Bluetooth address and the Bluetooth address received in step S404 and, only when these Bluetooth addresses are the same, carries out processing thereafter.

And when the Bluetooth module control program 20A of the personal computer 1 determines that the both acquired Bluetooth addresses are the same, an authentication processing is carried out in accordance with the pass key included in the device information, similarly to the above-described processing, and when the authentication is completed, Bluetooth communication based on the selected service is established.

As described above, since the Bluetooth module control program 20A compares the Bluetooth address notified from the reader/writer control program 19A and the Bluetooth address acquired from PDA 2 during the "Page", and the processing subsequent thereto is carried out only when they match each other, establishment of communication between undesired devices can be surely inhibited.

In the above-description, the case of establishing communication between the personal computer 1 and the PDA 2 and the case of establishing communication between the personal computer 1 and the access point 4, that is, the case of establishing communication between devices one to one has been described. However, it is of course that the present invention can be applied to a case of constituting a piconet or a scatternet with a single master and a plurality of slaves connected thereto.

In addition, the cases of establishing communication between the personal computer 1 and the PDA 2 or the access point 4 have been described particularly, in the above description. However, the present invention can be also applied between various devices.

For example, such a communication system as described above can be constituted between a mobile terminal such as the PDA 2 and devices including a television set, an automobile navigation system, an automatic vending machine, an ATM (automatic teller machine) and the like. In this case, communication via Bluetooth can be established if at least a reader/writer is installed in either one of the devices and a contactless IC card capable of providing device information to the reader/writer is installed in the other device.

In addition, if either one has a reader/writer, the present invention can be applied to establishment of synchronization within a piconet comprising, for example, mobile phones or PDA's, a PDA and a digital camera, or a PDA and a digital video camera.

Furthermore, in addition to connection simply between devices, reader/writers, contactless IC cards and Bluetooth modules may be provided, for example, in movable bodies including automobiles, trains, ships and planes, in buildings or throughout the town so as to connect to a network such as the Internet, a LAN (local Area Network) or a WAN (Wide Area Network) via the Bluetooth modules to configure a Ubiquitous society (Ubiquitous Network Society or Ubiquitous Computing Society).

In addition, the present invention can be applied to communication via other than Bluetooth, such as wireless LAN (IEEE (Institute of Electrical and Electronics Engineers) 802.11b).

Furthermore, communication other than Bluetooth includes IrDA, HomeRF (SWAP), Wireless1394, for example, and the present invention can be applied to these communication.

In addition, instead of the communication system in which power transmission and data transmission are carried out using a loop antenna as in the contactless IC card described above, any communication system can be employed as far as the communication system controls the output and has a communicable distance set shorter than Bluetooth communication system or the like in advance. For example, device information as described above can be provided to a device to be connected by using IrDA, bar codes and a bar-code reader.

In the above description, the device to communicate with is identified in accordance with the Bluetooth address. However, any information can be used as far as it is unique identification information.

For example, in a case where IPv6 (Internet Protocol version 6) comprising 128 bits is assigned to each device, a device being a master can specify the device to communicate with in accordance with the identification information notified from the contactless IC card or the reader/writer.

In addition, in the above description, as explained with reference to FIG. 15 and FIG. 16, for example, the terminal to communicate with via Bluetooth is specified in accordance with the device information transmitted/received to and from the contactless IC card reader/writer 19 of the personal computer 1 and the contactless IC card reader/writer 108 of the PDA 2. However, even in a case where no module carrying out short range wireless communication using electromagnetic induction is provided to the personal computer 1 and the PDA 2, it is possible to specify the terminal of the communication destination by controlling output power of a radio wave of a communication module.

Now, the communication system for specifying the terminal of the communication destination by controlling the output power of the radio wave output from the communication module will be explained.

Figure 22:
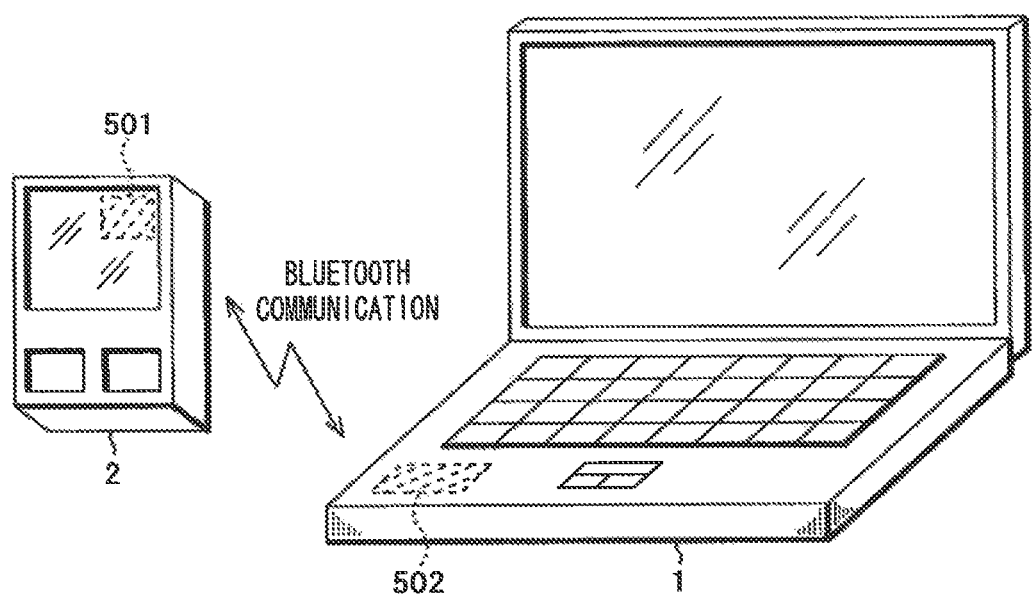
FIG. 22 is a figure which shows a structural example of a communication system.

FIG. 22 is a figure showing a structural example of the communication system for specifying the terminal of the communication destination by controlling the output power of the radio wave.

For example, in a case of specifying the communication destination via Bluetooth and establishing communication with the destination, the PDA 2 first controls the output power of the communication module 501 (Bluetooth module) to the minimum necessary so that the radio wave radiated reaches only within several centimeters, for example. In this way, in a state that a reduced power mode in which the output power of the radio wave is kept down is set, "Inquiry" is repeated to search a terminal existing in a range the radio wave reaches (for example, within a range of several centimeters).

And in a case where the user makes the PDA 2 close to the personal computer 1 and the radiated radio wave is received by a communication module 502 (a module carrying out communication in conformity with the same standard as the communication module 501) of the personal computer 1, the communication module 502 responds to the "Inquiry" and the communication module 501 sends "Inquiry" and "Page" toward the communication module 501 to establish a communication link. The communication link established here is effective within an extremely narrow range which the radio wave from the communication module 501 in which the reduced power mode is set reaches.

Therefore, the communication module 501 once breaks the communication link and changes the power mode setting of the communication module 501 from the reduced power mode to a normal power mode to enable communication with the communication module 502 even in a case where they are located some distance away, and thereafter, establishes the communication link with the communication module 502 again based on the information already acquired (information acquired through "Inquiry" and "Page" in a short range).

The communication link established again is effective in a range which the radio wave of several tens meters reaches, for example, similarly to the normal Bluetooth communication, and even in a case where the personal computer 1 and the PDA 2 are located good distance off, communication via Bluetooth is available.

As described above, even in a case where no reader/writer for transmitting/receiving device information is provided to the PDA 2, the user can establish Bluetooth communication between terminals by only making the PDA 2 close to the personal computer 1 by making the output power of the communication module controllable.

In other words, even in a case where a plurality of Bluetooth communicable devices exist around the PDA 2, it is possible to specify the personal computer 1 as the communication destination terminal and to establish the communication therebetween.

Incidentally, in a case where the power mode of the communication module 501 can be switched seamlessly, it may be arranged so that the power mode setting is switched from the reduced power mode to the normal power mode without breaking the communication link established during the reduced power mode.

Figure 23:
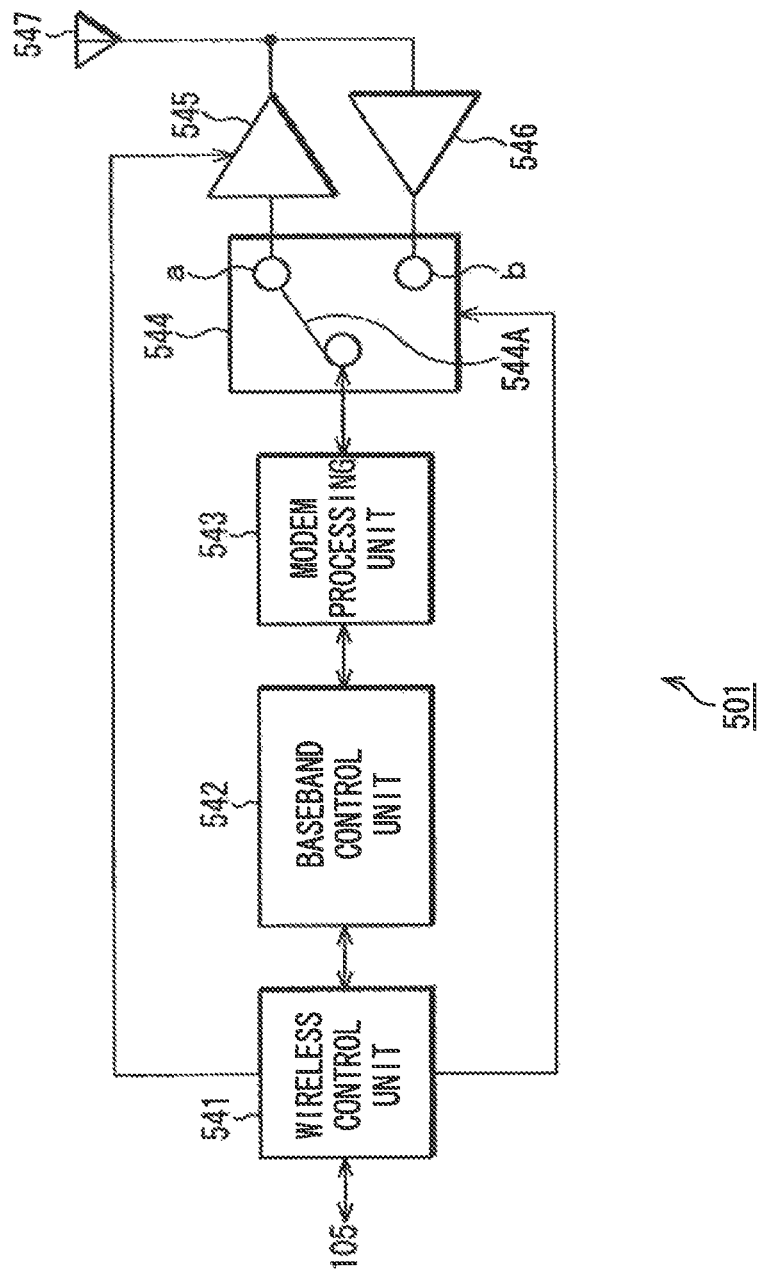
FIG. 23 is a block diagram which shows a structural example of a communication module of FIG. 22.

FIG. 23 is a block diagram showing a detailed structural example of the communication module 501 of FIG. 22.

The communication module 501 comprises a Bluetooth module, a wireless LAN module or the like, and, for example, in a case where it is constituted as the Bluetooth module, the construction thereof is basically similar to that of the Bluetooth module 20 (the Bluetooth module of the personal computer 1) shown in FIG. 4.

A wireless control unit 541 controls a changeover switch 544, and in a case of transmitting information from the communication module 501 to an external terminal, a switch 544A is connected to a side of a contact point "a", while, in a case of receiving information transmitted from the external terminal, the switch 544A is connected to a side of a contact point "b".

In addition, the wireless control unit 541 controls gain of a power amplifier 545 in accordance with the control from the CPU 101 carried out through the input/output interface 105 (FIG. 5) to control a range (output power) which the radio wave radiated from an antenna 547 reaches.

Specifically, in a case where the setting of the reduced power mode is instructed by the CPU 101, the wireless control unit 541 controls gain of the power amplifier 545 so as to minimize the range which the radio wave radiated from the antenna 547. On the other hand, in a case where the communication destination terminal can be specified and switching from the reduced power mode to the normal power mode is instructed, the wireless control unit 541 controls the gain of the power amplifier so as to make the range which the output radio wave reaches be larger.

A baseband control unit 542 controls a baseband signal of transmission/reception signals similarly to the baseband control unit 87 of FIG. 4. A modem processing unit 543 carries out GFSK modulation processing or a spectrum diffusion processing based on the hopping frequency on an output from the baseband control unit 542, and outputs an obtained signal from the antenna 547 via the power amplifier 545. In addition, the modem processing unit 543 carries out a spectrum reverse diffusion processing or a GFSK demodulation processing on an output from a LNA (Low Noise Amplifier), and outputs an obtained signal to the baseband control unit 542.

The structure of the communication module 502 provided to the personal computer 1 is similar to that of the communication module 501 shown in FIG. 23, and an explanation thereof is omitted.

Incidentally, as described above, in the communication system shown in FIG. 22, no contactless IC card reader/writer is provided to the personal computer 1 and the PDA 2.

Figure 24:
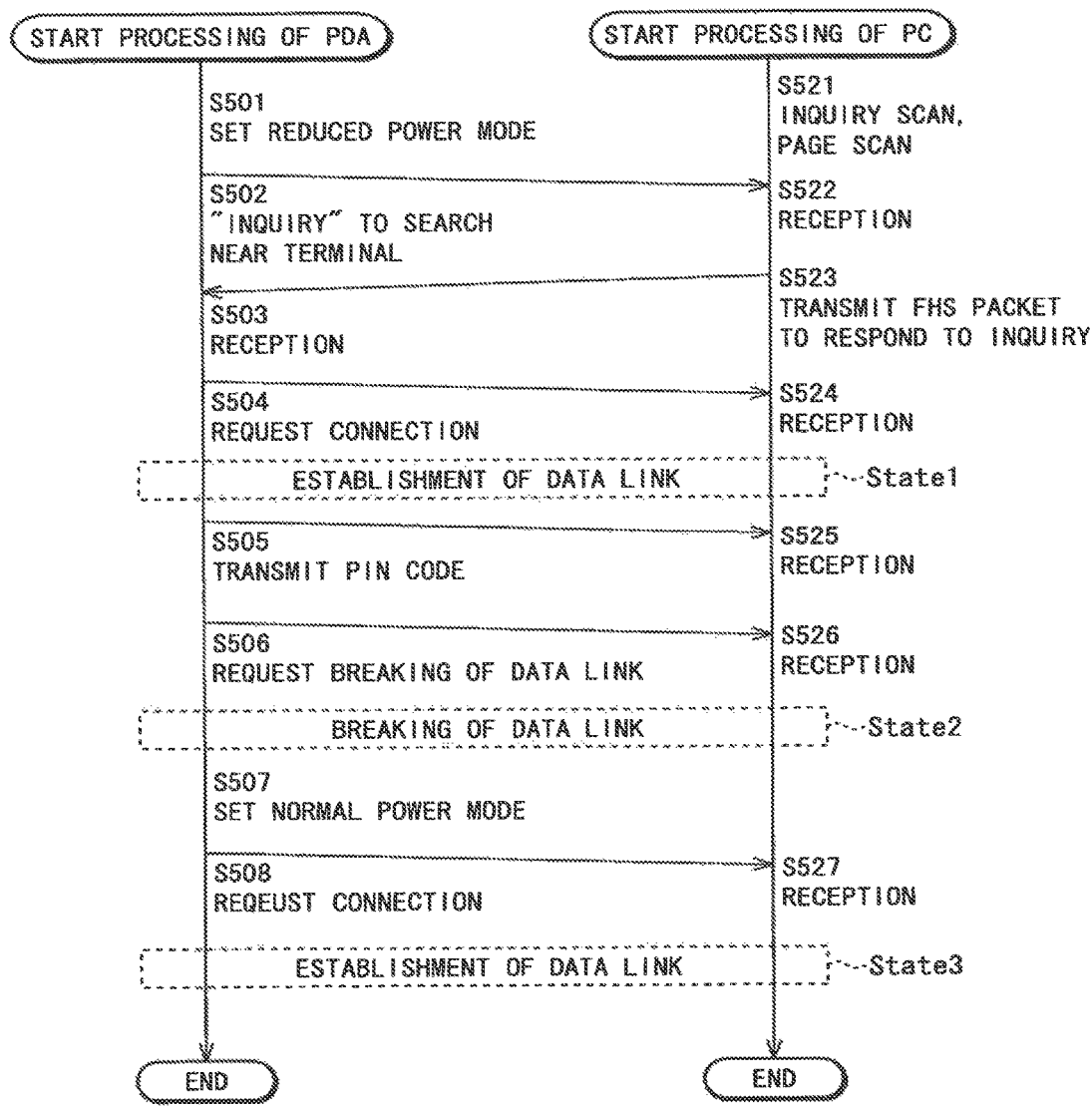
FIG. 24 is a flow chart explaining an operation of the communication system of FIG. 22.

Next, with reference to a flowchart of FIG. 24, operation of the communication system of FIG. 22 will be described. In FIG. 24, processing in a case of specifying a communication destination via Bluetooth and establishing the communication therebetween will be explained.

For example, when start of communication via Bluetooth is instructed by the user, the communication module 501 of the PDA 2 is activated in response to the control from the CPU 101 and the communication module 501 sets the reduced power mode as a power mode of its own in step S501. In addition, the communication module 501 executes "Inquiry" repeatedly and searches a terminal made close thereto in step S502.

In the "Inquiry" carried out in step S502, since the reduced power mode is set and the range which the radio wave reaches is minimized, an IQ packet (Inquiry packet) is repeatedly broadcasted within a range of several centimeters from the antenna 547, for example.

On the other hand, the communication module 502 of the personal computer 1 is in a state of executing an "Inquiry scan" and a "Page scan" repeatedly, and waits until another terminal requests "Inquiry" or "Page".

When the PDA 2 is made close to the personal computer 1 by the user and the communication module 502 of the personal computer 1 is within a range which the radio wave from the communication module 501 of the PDA 2 reaches, the IQ packet broadcasted from the communication module 501 is received by the communication module 502 in step S522.

When the communication module 502 receives the IQ packet broadcasted from the communication module 501, in order to respond thereto, it transmits an FHS packet to the communication module 501 in step S523. The FHS packet contains information indicating the Bluetooth address and the Bluetooth clock of the personal computer 1 as attribute information of the personal computer 1 (a slave in Bluetooth).

When the communication module 501 receives the FHS packet transmitted from the communication module 502 in step S503, it requests the communication module 502 for connection in step S504.

In other words, when an ID packet is transmitted from the communication module 501 to the communication module 502, and an ID packet identical to that ID packet is returned from the communication module 502 to the communication module 501, the FHS packet containing the Bluetooth address and the Bluetooth clock of the communication module 501 is transmitted from the communication module 501 to the communication module 502.

When the FHS packet transmitted from the communication module 501 is received by the communication module 502 in step S524, synchronization of the frequency axis (frequency hopping pattern) and the time axis (time slot) is established between the communication module 501 and the communication module 502, which results in a state where a data link (communication link) is established (State 1).

For example, in a case where a data link via Bluetooth is established for the first time between the communication module 502 and the communication module 501, the communication module 501 transmits a PIN (Personal Identification Number) code to the communication module 502 in step S505 to mutually carry out authentication.

The PIN code transmitted from the communication module 501 is received by the communication module 502 in step S525, and them, various link keys are set between the communication module and the communication module 502 on the basis of the PIN code and random numbers.

Incidentally, transmission/reception of the PIN code may be carried out after encryption using a public key provided from the communication module 502 to the communication module 501. In other words, in this case, the communication module 502 manages a private key corresponding to the public key to provide to the communication module 501 by itself. According to this operation, security is improved and communication via Bluetooth can be carried out only between the personal computer 1 and the PDA 2 more assuredly.

Since the communication link established as described above is effective within the range of several centimeters which the radio wave from the communication module 501 in which the reduced power mode is set reaches, the communication module 501 requests the communication module 502 to break the data link temporarily in step S506 to enable the communication with the communication module 502 even in a case of being away at a certain distance. At this time, information acquired in the previous processing, such as the Bluetooth address and the PIN code of the communication module 502, is stored in the communication module 501.

The communication module 502 which receives the request in step S526 stores information, such as the Bluetooth address or the PIN code of the communication module 501, acquired in the meantime similarly to the communication module 501, and breaks data link (State 2).

The communication module 501 sets the power mode of the output power to be the normal power mode in accordance with the control from the CPU 101 in order to establish the data link with the communication module 502 again in step S507. This results in that the radio wave of Bluetooth from the communication module 501 reaches the range of several tens meters, for example.

In addition, in step S508, the communication module 501 specifies the personal computer 1 as the communication destination terminal based on the information stored immediately before breaking the data link and requests the communication module 502 for connection.

This request is received by the communication module 502 in step S527, and setting is performed in each terminal. This results in a state that the data link is established between the communication module 501 and the communication module 502, that is, a state in which Bluetooth communication is available in a range of, for example, several tens meters, which the radio wave from the communication module 501 in which the normal power mode is set reaches (State 3).

As described above, according to application of the communication system of FIG. 22 which specifies the terminal close thereto as the communication destination terminal in the communication system of FIG. 1, even in a case where a contactless IC card reader/writer is not provided, the user can start communication between the PDA 2 and the personal computer 1 only by making the PDA 2 close to the personal computer 1.

In addition, in a similar way, the user can establish the data link between the PDA 2 and the access point 4 to connect the PDA 2 to the network 5 through the access point 4 only by taking the PDA 2 close to the access point 4.

Figure 25:
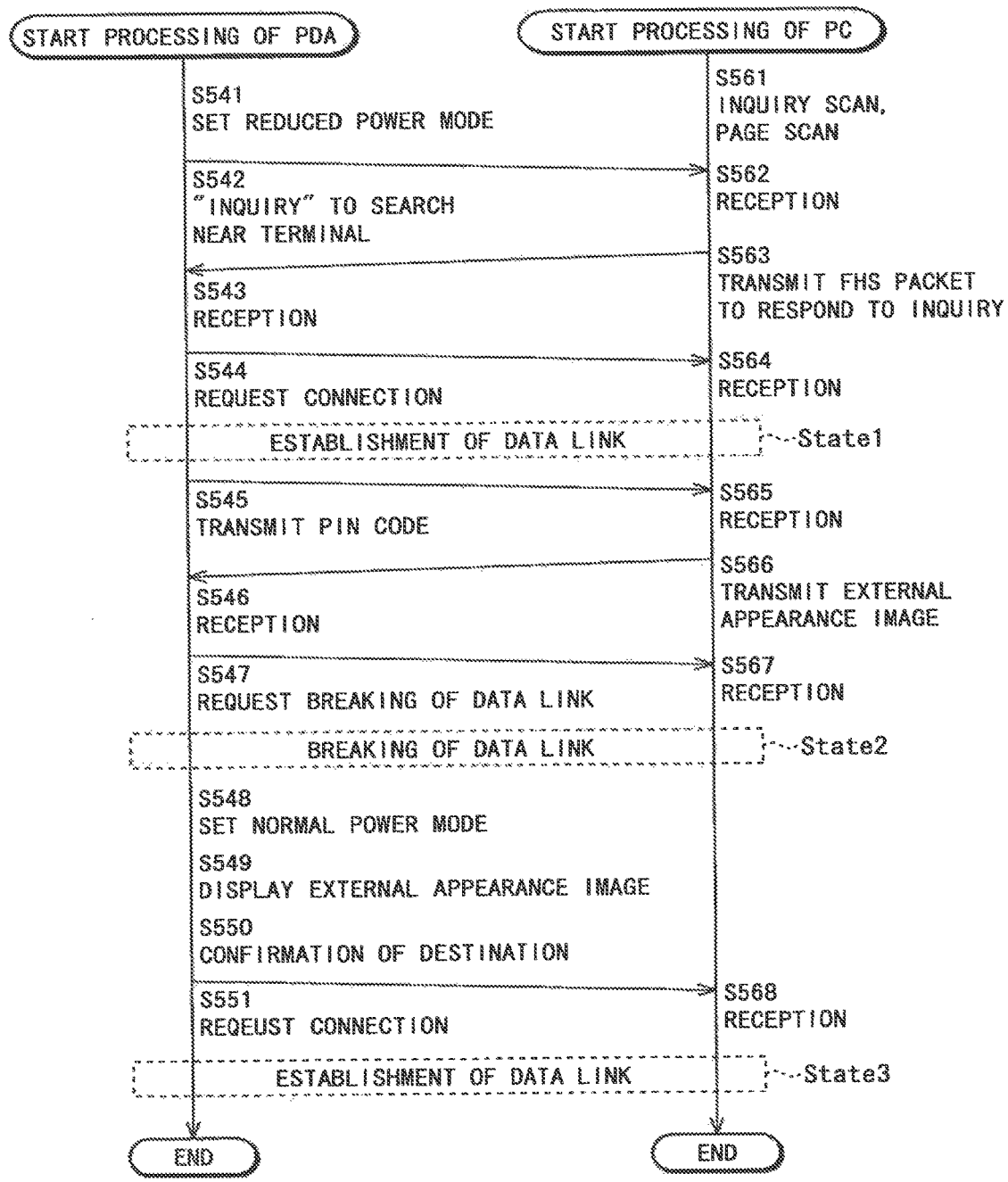
FIG. 25 is a flow chart explaining another operation of the communication system of FIG. 22.

FIG. 25 is a flow chart explaining another operation of the communication system of FIG. 22, and, in this processing, before establishing the data link in the normal power mode, external appearance of the communication destination device is displayed on the PDA 2 in order to make the user confirm the communication destination terminal (for example, the personal computer 1).

Processing by the PDA 2 in steps S541 to S545 and processing by the personal computer 1 in steps S561 to S565 are respectively similar to those in steps S501 to S505 and steps S521 to S525 in FIG. 24.

In other words, the data link which is communicable only in a range of, for example, several centimeters in the reduced power mode is established and the PIN code transmitted from the communication module 501 of the PDA 2 is received by the communication module 502 of the personal computer 1.

When the communication module 502 receives the PIN code, it transmits an image of the external appearance of the personal computer 1 prepared in advance in step S566.

The image of the external appearance transmitted from the communication module 502 is received by the communication module 502 in step S546 and is stored in a not shown flash memory or the like of the PDA 2.

The communication module 501 requests the communication module 502 to break the data link in the reduced power mode, and after breaking the data link temporarily, sets the normal power mode in step S548.

The CPU 101 of the PDA 2 displays the image of the external appearance of the personal computer 1 on an LCD 106 in accordance with the stored image data in step S549. This allows the user to confirm in advance the terminal of the communication destination with which the data link is established in the normal power mode.

For example, when connection to the personal computer 1 whose external appearance is displayed on the LCD 106 is instructed in step S550, the communication module 501 requests the communication module 502 for connection in the normal power mode in step S551.

When the request is received by the communication module 502, the data link in the normal power mode is established (State 3).

As described above, since an image of the external appearance the terminal is displayed on the basis of the data transmitted at the time when the data link in the reduced power mode is established, the user can more assuredly establish communication with the terminal of the communication destination that the user desires.

Incidentally, in the above description, when the communication in the reduced power mode is established, the image of the external appearance is transmitted as information indicating the communication destination device. However, in addition thereto, various characteristic information including the name of the communication destination device or the like may be present to the user.

In addition, voice information regarding the communication destination device is transmitted and voice guide based on the voice information is outputted, which can result in advance presentation of information regarding the device to connect thereto to the user even in a case where the device receiving the voice information has no display unit.

The above-described series of processing can be carried out not only by a hardware but also by a software.

In a case where the series of processing are carried out by a software, a program constituting the software is installed via a network or a recording medium into a computer which is incorporated in a dedicated hardware or a general purpose personal computer, for example, capable of executing various functions by installing various programs.

The recording medium comprises not only a package media comprising a magnetic disk 22 (including a floppy disk), an optical disc 23 (including a CD-ROM (Compact Disk-Read Only Memory), DVD (Digital Versatile Disk)), a magneto-optical disc 24 (including MD (registered trademark) (Mini-Disk)) or a semiconductor memory 25 on which a program is recorded to be distributed to a user to provide the program in addition to a main body of the device, but also the ROM 12 or the memory unit 18 in which the program is recorded to be provided to the user in a condition that it is incorporated in the main body of the device in advance.

In addition, in the present specification, a step for describing a program to be recorded in the recording medium includes processing carried out in time series in the order of description as well as processing carried out not always in time series but in parallel or individually.

In addition, in the present specification, the system means the whole device comprising a plurality of devices.

INDUSTRIAL APPLICABILITY

As described above, according to the present invention, communication can be started easily and promptly.

The invention claimed is:
1. An information processing apparatus, comprising:
a contactless communication unit configured to receive device information associated with a communication apparatus, the device information comprising identification information and service attribute information;
a wireless communication unit; and
a communication establishing unit configured to establish a direct wireless connection through the wireless communication unit with the communication apparatus using the identification information when at least one service is determined based on the service attribute information,
wherein the contactless communication unit, the wireless communication unit, and the communication establishing unit are each implemented via at least one processor.

2. The information processing apparatus according to claim 1,
wherein the at least one service is provided by the communication apparatus.

3. The information processing apparatus according to claim 2,
wherein the direct wireless connection is established through the at least one service provided by the communication apparatus.

4. The information processing apparatus according to claim 3, further comprising a controller,
wherein the at least one service comprises a plurality of services, and
wherein the controller is configured to select a service from the plurality of services determined based on the service attribute information.

5. The information processing apparatus according to claim 4,
wherein the controller is further configured to send a request for the selected service to the communication apparatus.

6. The information processing apparatus according to claim 1,
wherein the communication establishing unit is further configured to establish the direct wireless connection through the wireless communication unit with the communication apparatus when the wireless communication unit receives the identification information.

7. A communication apparatus comprising:
a contactless communication unit configured to send device information associated with the communication apparatus, the device information comprising identification information and service attribute information;
a wireless communication unit; and
a communication establishing unit configured to establish a direct wireless connection through the wireless communication unit with an information processing apparatus using the identification information when at least one service is determined based on the service attribute information,
wherein the contactless communication unit, the wireless communication unit, and the communication establishing unit are each implemented via at least one processor.

8. The communication apparatus according to claim 7,
wherein the at least one service is provided by the communication apparatus.

9. The communication apparatus according to claim 8,
wherein the direct wireless connection is established through the at least one service provided by the communication apparatus.

10. The communication apparatus according to claim 9, further comprising a controller,
wherein the at least one service comprises a plurality of services, and
wherein the controller is configured to select a service from the plurality of services determined based on the service attribute information.

11. The communication apparatus according to claim 7,
wherein the communication establishing unit is further configured to establish the direct wireless connection through the wireless communication unit with the information processing apparatus when the wireless communication unit sends the identification information.

12. An information processing method, performed via at least one processor, the method comprising:
receiving device information associated with a communication apparatus, the device information comprising identification information and service attribute information; and
establishing a direct wireless connection between an information processing apparatus associated with the at least one processor and the communication apparatus using the identification information when at least one service is determined based on the service attribute information.

* * * * *